United States Patent
Kaushal et al.

(10) Patent No.: US 11,888,944 B2
(45) Date of Patent: Jan. 30, 2024

(54) SYSTEM AND METHOD FOR DETERMINATION AND USE OF WORKFLOW CHARACTERISTICS WITH AN INTEGRATION CLOUD SERVICE

(71) Applicant: ORACLE INTERNATIONAL CORPORATION, Redwood Shores, CA (US)

(72) Inventors: Anuj Kaushal, Noida (IN); Prakash Kumar Devta, Bangalore (IN); Sumit Aneja, Noida (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/735,825

(22) Filed: May 3, 2022

(65) Prior Publication Data
US 2023/0362266 A1 Nov. 9, 2023

(51) Int. Cl.
*H04L 67/51* (2022.01)
*H04L 67/63* (2022.01)
*H04L 67/1014* (2022.01)

(52) U.S. Cl.
CPC .......... *H04L 67/51* (2022.05); *H04L 67/1014* (2013.01); *H04L 67/63* (2022.05)

(58) Field of Classification Search
CPC ...... H04L 67/51; H04L 67/1014; H04L 67/63
See application file for complete search history.

(56) References Cited

U.S. PATENT DOCUMENTS

| 10,432,631 | B2 | 10/2019 | Kaushal | |
|---|---|---|---|---|
| 10,585,678 | B2 | 3/2020 | Devta | |
| 2014/0278623 | A1* | 9/2014 | Martinez | G06Q 10/06 705/7.12 |
| 2017/0048285 | A1* | 2/2017 | Pearl | G06F 16/11 |
| 2017/0255886 | A1* | 9/2017 | Schmidt | G06Q 10/0633 |
| 2017/0264612 | A1 | 9/2017 | Kaushal | |
| 2019/0324763 | A1 | 10/2019 | Devta | |
| 2021/0203714 | A1 | 7/2021 | Devta | |
| 2021/0373915 | A1 | 12/2021 | Devta | |
| 2022/0038367 | A1 | 2/2022 | Devta | |
| 2022/0103648 | A1 | 3/2022 | Deshpande | |

(Continued)

*Primary Examiner* — Sm A Rahman
(74) *Attorney, Agent, or Firm* — TUCKER ELLIS LLP

(57) ABSTRACT

In accordance with an embodiment, described herein are systems and methods for (a) determining workflow characteristics for use with an integration cloud service or other computing environment; and (b) providing a marketplace that employs a conversational interface to guide users in selecting and retrieving integration artifacts, for example workflows or other assets, to address particular needs. A collection service can receive an indication of an integration archive that defines a business workflow or integration flow, wherein a characteristics server can then extract and persist the characteristics associated with the workflow, for subsequent use in providing a determination of workflows. In accordance with an embodiment, a digital assistant can be employed to allow discovery of workflows by building a discovery criteria based on a knowledge of characteristics associated with various business workflows or integration flows, and through interactive conversations by a user with the digital assistant.

15 Claims, 20 Drawing Sheets

(56) References Cited

U.S. PATENT DOCUMENTS

2022/0198562 A1\* 6/2022 Cella ..................... G06Q 40/04
2022/0214931 A1   7/2022 Devta
2022/0237104 A1\* 7/2022 Davis .................... G06F 3/0481
2022/0237197 A1   7/2022 Devta \* cited by examiner

SYSTEM AND METHOD FOR DETERMINATION AND USE OF WORKFLOW CHARACTERISTICS WITH AN INTEGRATION CLOUD SERVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments described herein are generally related to cloud computing environments, and are particularly directed to systems and methods for determining workflow characteristics for use with an integration cloud service or other computing environment; and providing a marketplace that employs a conversational interface to guide users in selecting and retrieving integration artifacts, for example workflows or other assets, to address particular needs.

BACKGROUND

Generally described, an integration cloud platform enables the integration of various software products or applications, such as for example software-as-a-service (SaaS) applications and/or on-premises applications, which can then be made accessible to consumers via a cloud computing environment.

Some cloud environments offer an integration-platform-as-a-service (iPaaS) environment, and can support, for example, a web-based integration design tool for point-and-click configuration of the integration between the various applications, and a monitoring dashboard that provides real-time insight into transactions involving those applications. Such environments can be used to simplify the means by which a variety of otherwise different applications, technologies, and processes can be integrated to create business workflows that execute within the cloud.

With a service-oriented design strategy, service reusability is a commonly-preferred design principle, and with such a design it may be beneficial to structure business workflows so that the workflows can be re-used across one or more business entities. To address this, some cloud vendors make available customer/consumer-agnostic or pre-built workflows to their platform consumers, through one or more paid or free channels.

SUMMARY

In accordance with an embodiment, described herein are systems and methods for (a) determining workflow characteristics for use with an integration cloud service or other computing environment; and (b) providing a marketplace that employs a conversational interface to guide users in selecting and retrieving integration artifacts, for example workflows or other assets, to address particular needs.

In accordance with an embodiment, an integration cloud service design console allows a user to design an integration flow that can then be deployed and executed by the integration cloud service runtime. A collection service can receive an indication of an integration archive that defines a business workflow or integration flow, wherein a characteristics server can then extract and persist the characteristics associated with the workflow, for subsequent use in providing a determination of workflows.

In accordance with an embodiment, a digital assistant can be employed to allow discovery of workflows by building a discovery criteria based on a knowledge of characteristics associated with various business workflows or integration flows, and through interactive conversations by a user with the digital assistant.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Generally described, an integration cloud platform enables the integration of various software products or applications, such as for example software-as-a-service (SaaS) applications and/or on-premises applications, which can then be made accessible to consumers via a cloud computing environment.

Examples of integration cloud platform environments include Oracle Integration Cloud (OIC), and Oracle Cloud Integration (OCI), which support the use of an integration cloud service (ICS), and which can be provided, for example, as part of an Oracle Cloud or other type of cloud environment.

Some cloud environments offer an integration-platform-as-a-service (iPaaS) environment, and can support, for example, a web-based integration design tool for point-and-click configuration of the integration between the various applications, and a monitoring dashboard that provides real-time insight into transactions involving those applications. Such environments can be used to simplify the means by which a variety of otherwise different applications, technologies, and processes can be integrated to create business workflows that execute within the cloud.

Cloud Computing Environments

Figure 1:
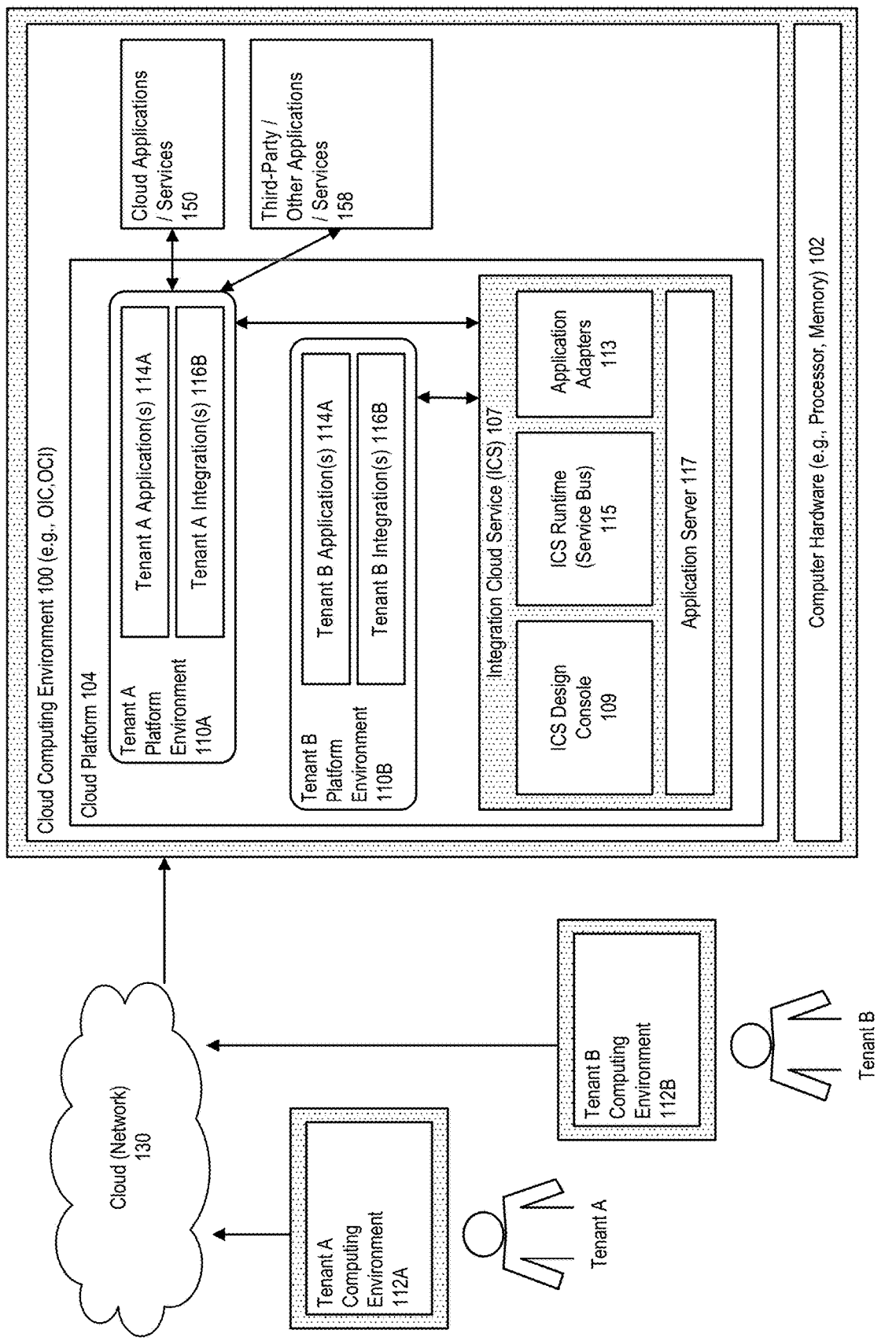
FIG. 1 illustrates an example cloud computing environment that enables determination and use of workflow characteristics with an integration cloud service or other computing environment, in accordance with an embodiment.

FIG. 1 illustrates an example cloud computing environment that enables determination and use of workflow characteristics with an integration cloud service or other computing environment, in accordance with an embodiment.

As illustrated in FIG. 1, in accordance with an embodiment, a cloud computing environment (cloud environment) 100, such as for example an integration cloud service (ICS), operating at one or more computers that includes a computer hardware (e.g., processor, memory) 102, can be used to provide a cloud computing platform (cloud platform) 104.

In accordance with an embodiment, examples of such a cloud environment and cloud platform can include Oracle Cloud, and Oracle Integration Cloud (OIC)/Oracle Cloud Integration (OCI) respectively. In accordance with various embodiments, the teachings described herein can also be used with other types of cloud environment or cloud platform, including, for example, other types of platform-as-a-service (PaaS) cloud environments or cloud platforms.

In accordance with an embodiment, each of a plurality of tenants of the cloud environment, for example a first tenant A, can be associated with a tenant platform environment 110, for use with the tenant's computing environment 112, and with one or more cloud software application(s) 114, and/or integration(s) 116. For example in accordance with an embodiment, the tenant can access their platform environment from an on-premise computing environment via a cloud computing environment 130 or other type of network or communication environment.

In accordance with an embodiment, a tenant platform environment can utilize one or more cloud software applications or services 150, or third-party or other software applications or services 158, provided by the cloud platform. The cloud platform can orchestrate use by the tenant platform environment, or by software applications executing therein, of various lifecycle activities provided within cloud platform.

In accordance with an embodiment, the integration cloud service 107 can include a design console 109, an integration cloud service runtime 115, and adapters 113 that simplify the task of configuring connections to applications, and execute on an application server 117 within the cloud environment. As further described below, the integration cloud service design console can provide a design time environment that allows a user to design, activate, manage, and monitor a workflow (e.g., a business workflow) that uses integration artifacts (e.g., an integration flow), that can then be deployed and executed on the integration cloud service runtime.

For example, in accordance with an embodiment, a cloud platform operating as an integration platform can orchestrate various software applications and multiple modules working together, such as, for example, activation, connection test, metadata loading, invoke target endpoint, transformation, request received by an integration, or various other types of modules; and can provide various lifecycle activities performed by these modules. During runtime, the modules can then execute the lifecycle activities to address various use-cases.

In accordance with an embodiment, the various components and processes illustrated in FIG. 1, and as further described herein with regard to various embodiments, can be provided as software or program code executable by a computer system or other type of processing device. For example, in accordance with an embodiment, the components and processes described herein can be provided by a cloud computing system, or by another suitably-programmed computer system.

Integration Cloud Service

Figure 2:
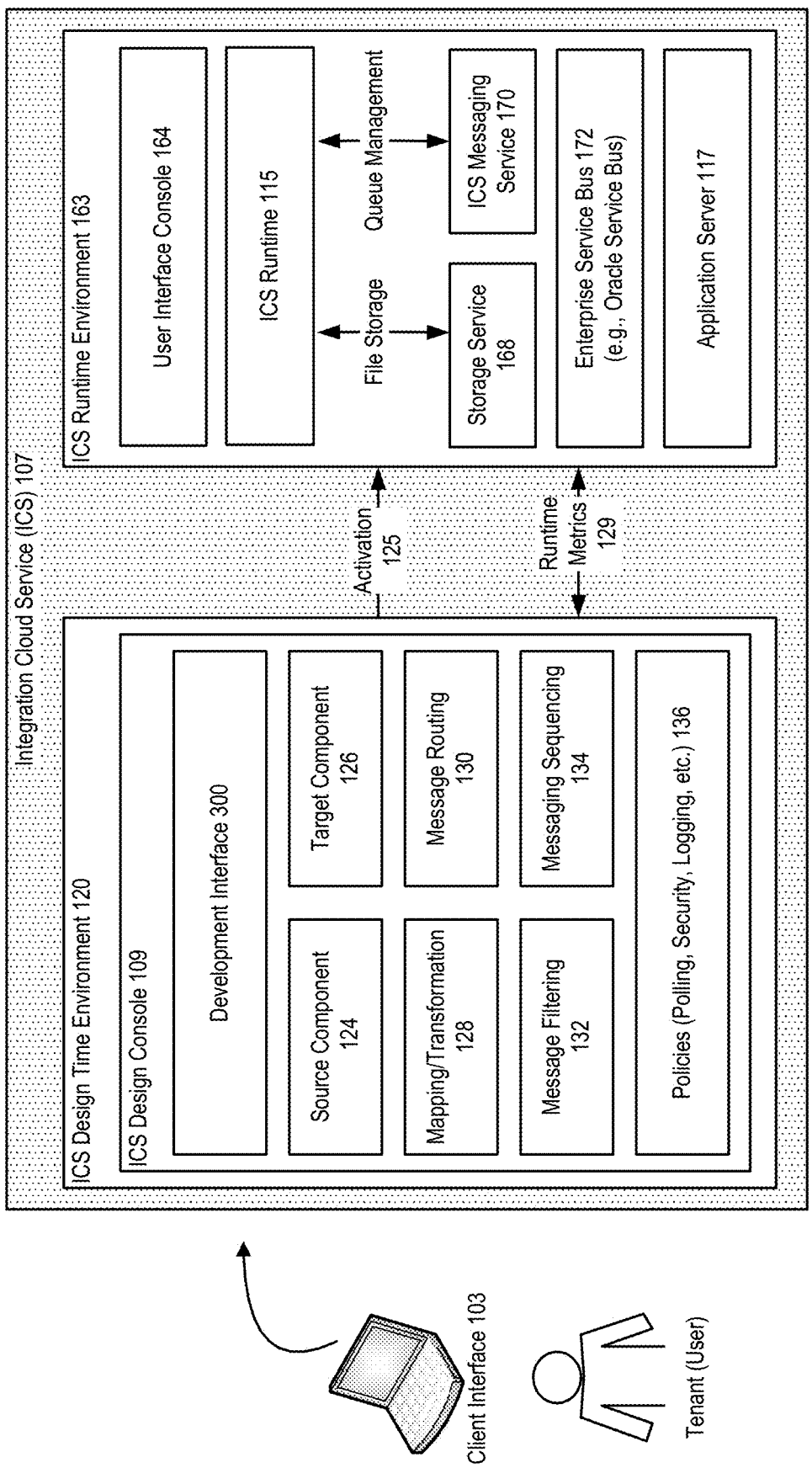
FIG. 2 further illustrates an example integration cloud service, in accordance with an embodiment.

FIG. 2 further illustrates an example integration cloud service, in accordance with an embodiment.

As described above, in accordance with an embodiment, the integration cloud service can include a design console, and an integration cloud service runtime, that together allow a user to design, activate, manage, and monitor a workflow that uses integration artifacts (e.g., an integration flow), that can then be deployed and executed on the integration cloud service runtime.

As illustrated in FIG. 2, in accordance with an embodiment, the design-time environment 120 can includes a development interface 300 which provides a browser-based or similar interface that allows an integration flow developer to build integrations using a client interface 103.

In accordance with an embodiment, the integration cloud service design-time environment can be pre-loaded with connections to various SaaS applications or other applications, and can include a source component 124, and a target component 126. The source component can provide definitions and configurations for one or more source applications/objects; and the target component can provide definitions and configurations for one or more target applications/objects. The definitions and configurations can be used to identify application types, endpoints, integration objects and other details of an application/object.

As further illustrated in FIG. 2, in accordance with an embodiment, the design-time environment can include a mapping/transformation component 128 for mapping content of an incoming message to an outgoing message, and a message routing component 130 for controlling which messages are routed to which targets based on content or header information of the messages. Additionally, the design-time environment can include a message filtering component 132, for controlling which messages are to be routed based on message content or header information of the messages; and a message sequencing component 134, for rearranging a stream of related but out-of-sequence messages back into a user-specified order.

In accordance with an embodiment, each of the above of the described components, as with the source and target components, can include design-time settings that can be persisted as part of an integration flow definition/configuration.

In accordance with an embodiment, an integration flow definition specifies the details of an integration cloud service integration flow; and encompasses both the static constructs of the integration flow (for example, message routers), and the configurable aspects (for example, routing rules). A fully configured flow definition and other required artifacts (for example, JCA and .WSDL files) in combination can be referred to as an integration project, or integration archive. An integration archive can fully define an integration flow, and can be implemented by an underlying implementation layer.

In accordance with an embodiment, a policies component 136 can include a plurality of policies that govern behaviors of the integration cloud service environment. For example, a polling policy can be configured for source-pull messaging interactions (i.e. query style integrations) for a source application, to invoke an outbound call to the source application via a time-based polling.

In accordance with an embodiment, other policies can be specified for security privileges in routing messages to a target application; for logging message payloads and header fields during an integration flow execution for subsequent analysis via a monitoring console; and for message throttling used to define a number of instances that an enterprise service bus (ESB) service can spawn to accommodate requests. In addition, policies can be specified for monitoring/tracking an integration flow at an integration flow level; and for validating messages being processed by the integration cloud service platform against a known schema.

In accordance with an embodiment, an integration developer can drag and drop a component on a development canvas 133 for editing and configuration, for use in designing an integration flow.

As further illustrated in FIG. 2, in accordance with an embodiment, the integration cloud service runtime environment 163 can include a storage service 168 and a messaging service 170 on top of an enterprise service bus component 172. The design-time environment can communicate with the runtime environment, or with a user interfaces console 164, to activate 125, and subsequently retrieves runtime metrics 129, or otherwise monitor and track performance of the integration cloud service runtime environment.

Figure 3:
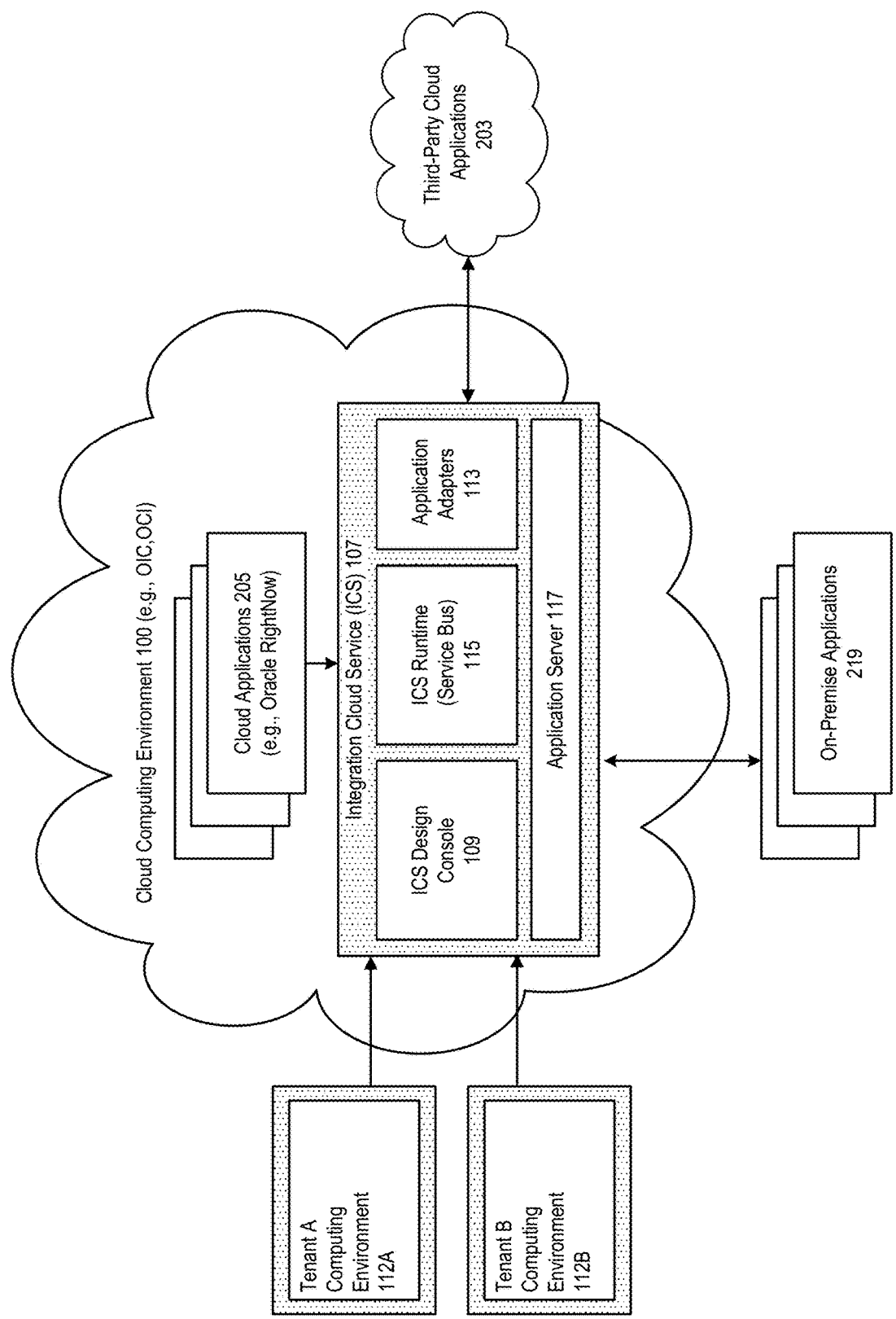
FIG. 3 further illustrates an example integration cloud service, in accordance with an embodiment.

FIG. 3 further illustrates an example integration cloud service, in accordance with an embodiment.

As illustrated in FIG. 3, in accordance with an embodiment, a plurality of application adapters can be provided to simplify the task of configuring connections to a plurality of applications, by handling the underlying complexities of connecting to those applications.

For example, in accordance with an embodiment, the applications can include one or more enterprise cloud applications of 205, third-party cloud applications (for example, Salesforce) 203, and on-premises applications 219. The integration cloud service can expose simple object access protocol (SOAP) and representational state transfer (REST) endpoints to these applications for use in communicating with these applications.

In accordance with an embodiment, an integration cloud service integration flow can include a source connection, a target connection, and field mappings between the two connections. Each connection can be based on an application adapter, and can include additional information required by the application adapter to communicate with a specific instance of an application.

In accordance with an embodiment, an integration cloud service integration flow and a plurality of other required artifacts (for example, JCA and WSDL files) can be compiled into an integration archive, which can be deployed and executed in the integration cloud service runtime.

In accordance with an embodiment, a plurality of different types of integration flow patterns can be created using the web UI application, including data mapping integration flows, publishing integration flows, and subscribing integration flows.

For example, in accordance with an embodiment, to create a data mapping integration flow, an integration cloud service user can use an application adapter or an application connection to define a source application and a target application in the development interface, and define routing paths and data mappings between the source and target application. In a publishing integration flow, a source application or a service can be configured to publish messages to the integration cloud service through a predefined messaging service. In a subscribing integration flow, a target application or service can be configured to subscribe to messages from the integration cloud service through the messaging service.

Figure 4:
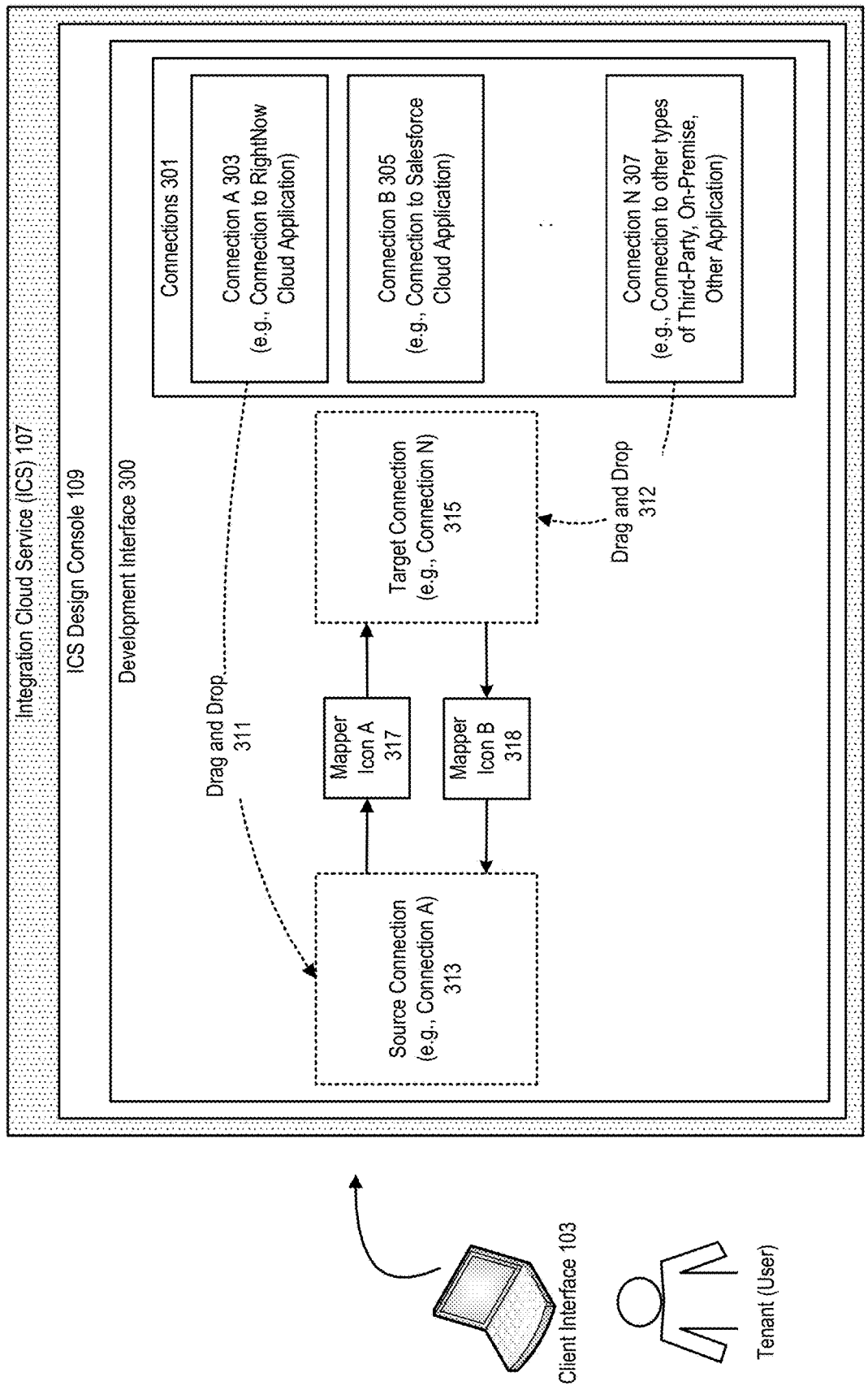
FIG. 4 illustrates an example integration cloud service design time, in accordance with an embodiment.

FIG. 4 illustrates an example integration cloud service design time, in accordance with an embodiment.

As illustrated in FIG. 4, in accordance with an embodiment, a development interface (e.g., a development canvas) can be used to create an ICS integration flow, using a plurality of existing connections 301, for example, connection A 303, connection B 305 and connection N 307.

As further illustrated in FIG. 4, in accordance with an embodiment, a particular connection (for example, connection A) can be dragged and dropped 311 to the development interface as a source connection 313, and connection N can be dragged and dropped 312 to the development interface as a target connection 315. The source connection can include information required to connect to a source application, and can be used by the ICS to receive requests from the source application. The target connection can include information required to connect to a target application (for example, a Salesforce cloud application), and can be used by the ICS to send requests to the target application.

In accordance with an embodiment, the source and target connections can be further configured to include additional information. For example, the additional information can include types of operations to be performed on data associated with a request, and objects and fields against those operations.

In accordance with an embodiment, once the source and target connections are configured, mappings (mappers) between the two connections can be enabled, and mapper icons (for example, mapper icon A 317 and mapper icon B 318) can be displayed for use in opening the mappers, so that the user can define how information is transferred between a source and target data objects for both the request and response messages.

In accordance with an embodiment, the mappers can provide a graphical user interface for the user to map items (for example, fields, attributes, and elements) between the source and target applications by dragging a source item onto a target item. When a mapper for a request or response message in an ICS integration flow is opened, the source and target data objects can be automatically loaded using the source and target connections.

In accordance with an embodiment, lookups can be provided to facilitate the creation of mappings. As used herein, lookups are reusable mappings for different codes and terms used in applications to describe the same item. For example, one application uses a specific set of codes to describe countries, while another application uses a different set of codes to describe the same countries. Lookups can be used to map these different codes across the different applications.

As described above, development of an integration flow can be a complex effort requiring various components to be defined before the integration flow can be successfully deployed and executed. Some components within an integration flow are required to be defined while others are optional. Further complicating the development process is that defining optional components may lead to additional required components, and that the required components at any point in time during the development effort may vary, depending upon the order in which the integration components were defined.

I. Determination and Use of Workflow Characteristics

In accordance with an embodiment, the systems and methods described herein can be used in determining workflow characteristics for use with an integration cloud service or other computing environment.

In accordance with an embodiment, an integration cloud service design console allows a user to design an integration flow that can then be deployed and executed by the integration cloud service runtime. A collection service can receive an indication of an integration archive that defines a business workflow or integration flow, wherein a characteristics server can then extract and persist the characteristics associated with the workflow, for subsequent use in providing a determination of workflows.

As described above, with a service-oriented design strategy, service reusability is a commonly-preferred design principle, and with such a design it may be beneficial to structure business workflows so that the workflows can be re-used across one or more business entities. To address this, some cloud vendors make available customer/consumer-agnostic or pre-built workflows to their platform consumers, through one or more paid or free channels.

Today's iPaaS providers are continuously striving to simplify how various applications, technologies, and processes can be integrated to create business workflows in the cloud. Increasingly, specialist third-party vendors are looking to provide similar pre-built workflows, under the general characterization of integration-software-as-a-service (iSaaS). Although some integration platforms provide tools for basic discoverability; a unified mechanism to discover workflows built by different individuals/companies, from different repositories, with a plurality of characteristics is not available.

In accordance with an embodiment, an integration platform that provides advanced discoverability of workflows provides an edge over other approaches, since it can allow consumers to search for workflows based on several dimensions, and additionally provide recommendations as to pre-built workflows, based on the existing characteristics of an integration platform consumer.

Figure 5:
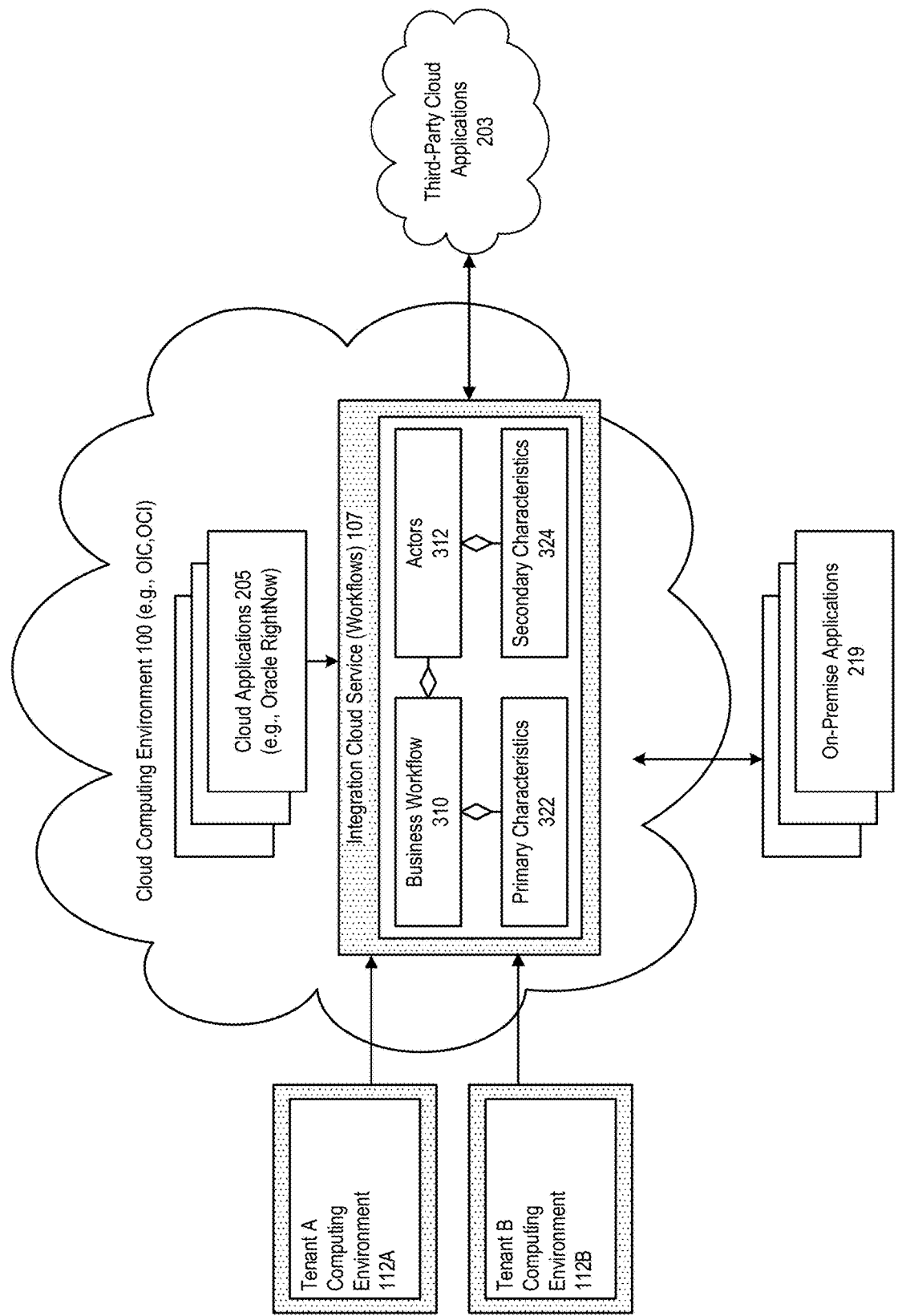
FIG. 5 illustrates various examples of characteristics associated with integration cloud service workflows, in accordance with an embodiment.

FIG. 5 illustrates various examples of characteristics associated with integration cloud service workflows, in accordance with an embodiment.

As illustrated in FIG. 5, in accordance with an embodiment, each business workflow or integration flow 312 comprises several actors 312. For example, these actors could be external systems the workflow integrates with to achieve the business objectives. Each of the actors within a workflow has characteristics, for example one or more primary characteristics 320 and/or secondary characteristics 322, as further described below. The union of the characteristics of each actor in a workflow, along with the characteristics of the workflow itself, collectively is defined as the characteristics of a workflow.

In accordance with an embodiment, definitions of business workflows or integration flows can be stored or persisted as integration archives in various repositories, such as, for example, repositories of a tenant's own integration instance, repositories of an integration marketplace, and/or community repositories.

In accordance with an embodiment, the systems and methods described herein enable discoverability of such workflows, and provide integration cloud consumers with an ability to search for workflows based on several dimensions, thereby promoting reuse of pre-built workflows, and reducing the cost of development.

In accordance with an embodiment, the systems and methods can be used to allow an integration platform to recommend pre-built workflows based on the existing integration assets of an integration platform consumer.

FIGS. 6-9 illustrate how different types of users can contribute integration cloud service workflows, for use with the system, in accordance with an embodiment.

Figure 6:
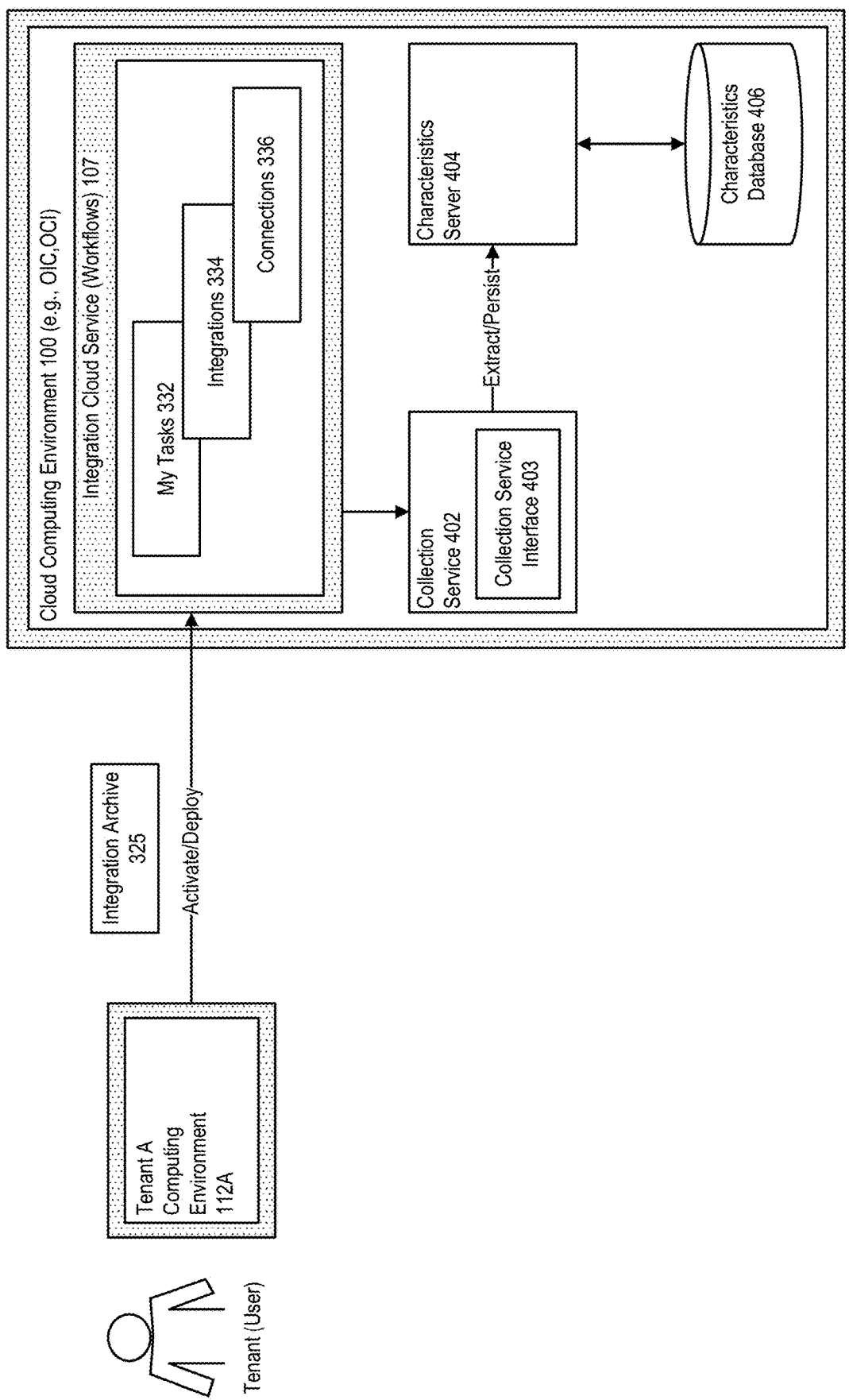
FIG. 6 illustrates how different types of users can contribute integration cloud service workflows, for use with the system, in accordance with an embodiment.
Figure 7:
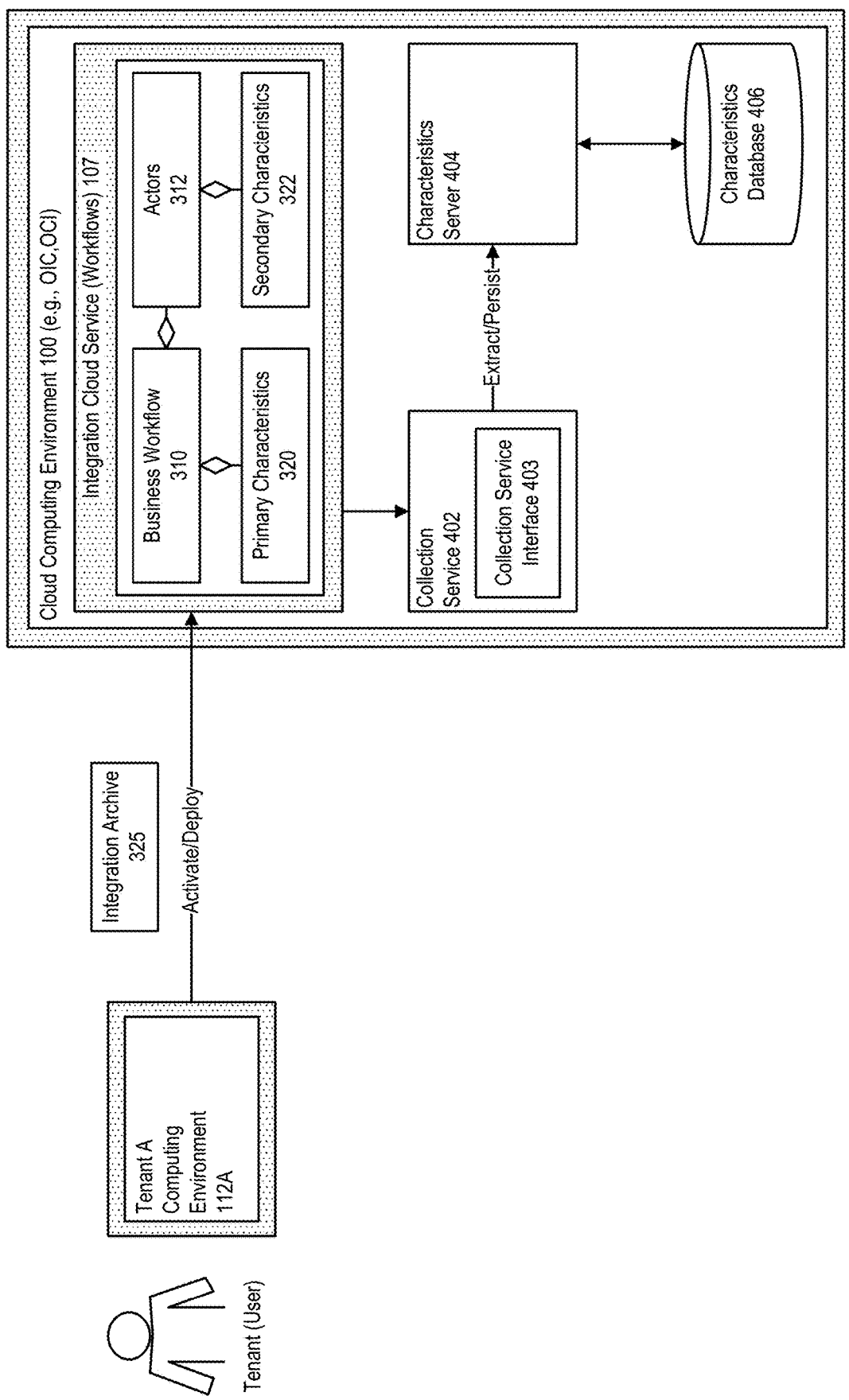
FIG. 7 further illustrates how different types of users can contribute integration cloud service workflows, for use with the system, in accordance with an embodiment.

As illustrated in FIGS. 6-7, a business workflow or integration flow can encompass several tasks 332, integrations 334, and/or connections 336. A collection service 402, and collection service interface 403, can receive an indication of an integration archive that defines a business workflow or integration flow, wherein a characteristics server 404 can then extract and persist the characteristics associated with the workflow, for storage in a characteristics database 406, for subsequent use in providing a determination of workflows.

In accordance with an embodiment, upon activation/upload/commit of a particular business workflow or integration flow, the system can access the integration archive and submit it to the collection service, which extracts the characteristics associated with the workflow, and persists them in the characteristics database.

For example, in accordance with an embodiment, for a consumer integration tenant, a post-activation/deployment, an asynchronous call can be sent to post the characteristics of the integration to the collection service.

Figure 8:
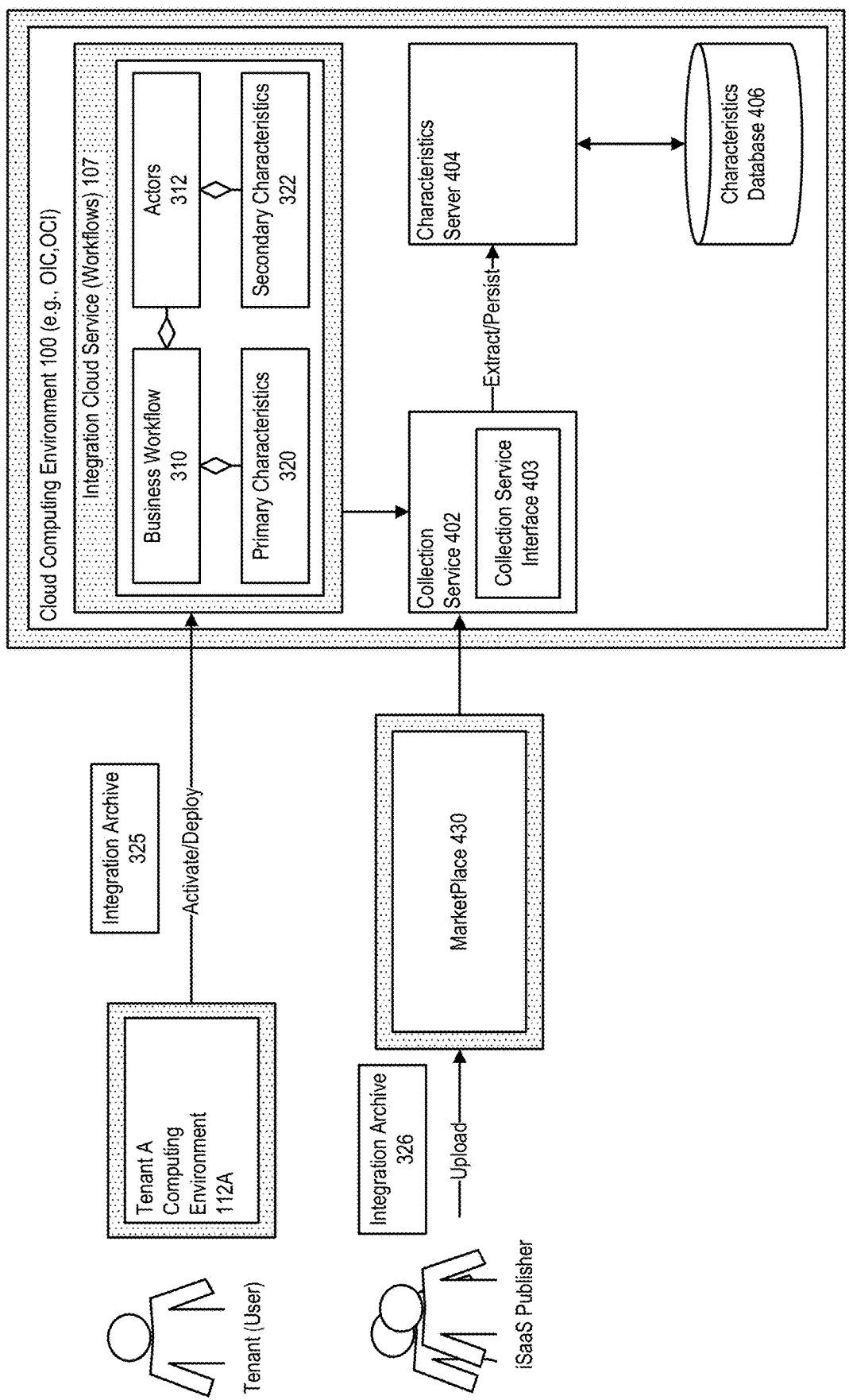
FIG. 8 further illustrates how different types of users can contribute integration cloud service workflows, for use with the system, in accordance with an embodiment.

As illustrated in FIG. 8, in accordance with an embodiment for a marketplace 430, at the time of upload of an integration archive 326 that defines a business workflow or integration flow, an asynchronous call can be sent to post the characteristics of the integration to a collection service.

Figure 9:
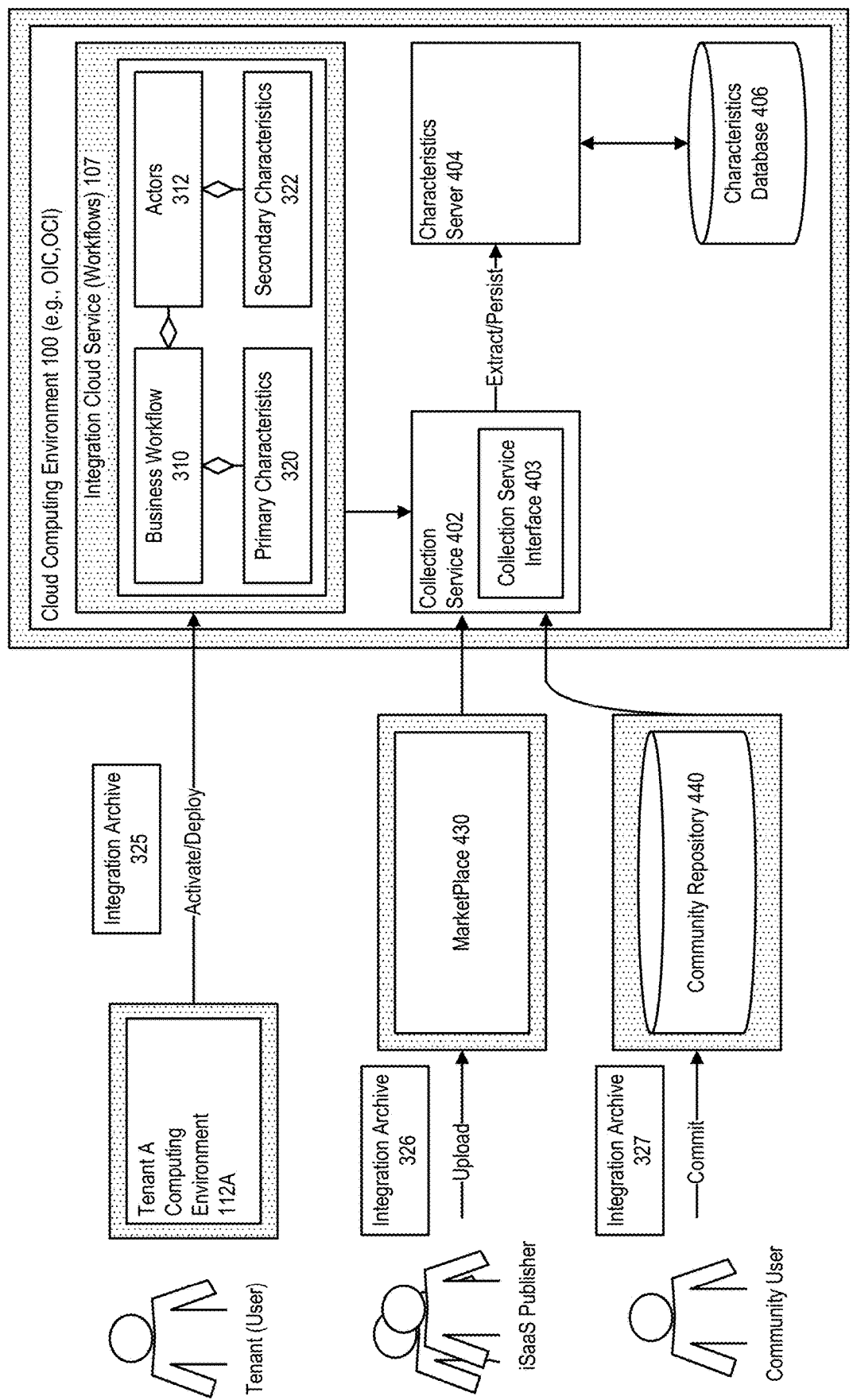
FIG. 9 further illustrates how different types of users can contribute integration cloud service workflows, for use with the system, in accordance with an embodiment.

As illustrated in FIG. 9, in accordance with an embodiment, for a community repository 440, a job/event can be configured on commit to post the integration archive 327 to the collection service, when a business workflow or integration flow is added to the repository.

Collection Service Interface

As described above, in accordance with an embodiment, a collection service and collection service interface can receive an indication of an integration archive that defines a business workflow or integration flow, wherein a characteristics server can then extract and persist the characteristics associated with the workflow, for storage in a characteristics database, for subsequent use in providing a determination of workflows.

In accordance with an embodiment, Example 1 illustrates an example of a collection service interface that can be accessed at a particular endpoint URL:

| Method | Post |
|---|---|
| Endpoint URL | https://<host>:<port>/flows/collect |
| Request | Request<br>{<br>  "iar": "ASDFAAGASSzsSS=="<br>} |
| RESPONSE | 202 (Accepted) |

Example 1—Collection Service Interface

In accordance with an embodiment, the collection service can scan a workflow integration archive, and extract its primary characteristics and a set of secondary characteristics pertaining to the type of interactions that are a part of the workflow. In addition, there can be additional dynamic or tertiary characteristics that can be updated periodically.

Example Workflow Characteristics

In accordance with an embodiment, Example 2 illustrates an example of various workflow primary, secondary, and dynamic (tertiary) characteristics that can be extracted by the characteristics server, associated with the workflow, and persisted to the characteristics database:

| Attribute | Type | Description |
|---|---|---|
| *Primary Characteristics* | | |
| License Type | FREE | PAID | Type of license under which the integration artifact (e.g., workflow) is available |
| Source | TENANCY | MARKET_PLACE | COMMUNITY | The source of the integration artifact |
| Publisher | TENANCY_NAME | ISAAS_NAME | USER_NAME | The name of the publisher providing integration artifact |
| Integration name | ORDER_BOOKING | Name of the integration artifact |
| Integration version | 1.0 | Version |
| *Secondary Characteristics* | | |
| AdapterType | Application | TECHNOLOGY | PAAS | STANDARDS | |
| AdapterName | Service Cloud | Oracle Sales Cloud | SalesForce | |
| EndpointConfigurationSummary | | An endpoint configuration summary in a concise, flowing conversational way |
| EndpointConfiguration | INBOUND | OUTBOUND | Whether the adapter is used for invoking an external API or as a trigger |
| InvocationOperationName | | Target service operation that is being invoked |
| InvocationProtocol | JDBC | HTTP | FTP | SOAP | REST | Communication protocol |
| InvocationConnectivityMode | CLOUD | CONNECTIVITY_AGENT | DIRECT_CONNECTIVITY | Connectivity that adapter uses based on application deployment |
| Authentication Type | NO_SECURITY | BASIC_AUTH | AUTH1.0a | OAUTH2.0 | Policy used to authenticate with target application |
| InvocationStyle | SYNC_REQUEST_RESPONSE | FIRE_AND_FORGET | SYNC_PULL | ASYNC_CALLBACK | Message exchange pattern |
| FunctionalPattern | REAL_TIME | BATCH_PROCESSING | BULK_IMPORT_SUBMISSION | BULK_IMPORT_STATUS | BULK_IMPORT_RESPONSE | ATOM_FEED | QUERY | FILE_UPLOAD | LOCAL_INVOCATION | Defines the functional intent of the API |
| ArtifactType | BUSINESS_OBJECT | SOAP_SERVICE | FBDI_JOB | TABLE | QUEUE | TOPIC | DATA_EXTRACT | BI_PUBLISHER_REPORT | FILE | x12 | UN_EDIFACT | The type of data used for exchange with target service |

-continued

| Attribute | Type | Description |
|---|---|---|
| ArtifactValue | Type: DataExtract Value: Payroll. | Name of artifact type |
| AttachmentSupport | ATTACHMENT_UPLOAD \| ATTACHMENT_DOWNLOAD \| ATTACHMENT_UPLOAD_DOWNLOAD | Operation support attachment, e.g. file upload or download |
| CustomArtifact | YES \| NO | If the operation is on a custom object |
| Dynamic (tertiary) characteristics | | |
| Upload time | Ts: 12312312121 | Timestamp in UTC when this business integration was uploaded |
| Active usage count. | Integer: 5500 | Total number of downloads of a given business integration flow |

Example 2—Workflow Characteristics

Persistence of Workflows

In accordance with an embodiment, the characteristics can be persisted in a database, such as a relational database, for example as illustrated in Example 3:

persist the characteristics associated with the workflow, for subsequent use in providing a determination of workflows.

Association of Workflows to Secondary Characteristics

In accordance with an embodiment, Example 4 illustrates an example table of secondary characteristics:

| ID | Name | Endpoint Summary | Operation Name | Protocol | Authentication Mode | Invocation style | Functional Pattern | Artifact type | Artifact value | Attachment |
|---|---|---|---|---|---|---|---|---|---|---|
| 1 | SF | Create account in salesforce | Create | REST | Oauth | SYNC_REQUEST_RESPONSE | REAL_TIME | Business_object | Account | None |
| 2 | SN | Create account in ServiceNow | Create | REST | Oauth | SYNC_REQUEST_RESPONSE | REAL_TIME | Business_object | Account | None |
| 3 | RN | Create account in RightNow | Create | SOAP | Basic_auth | SYNC_REQUEST_RESPONSE | REAL_TIME | Business_object | Account | None |
| 4 | E | Create account in ERP | Create | SOAP | Basic_auth | SAML | REAL_TIME | Business_object | Account | None |
| 5 | E | Bulk Import of data into ERP Cloud using FBDI Job: Post Mass Retirements | Import BulkData | SOAP | USERNAME_PASSWORD_TOKEN | SAML | BULK_IMPORT | FBDI_JOB | Post Mass Retirements | Yes |

| Integration_ID | Version | License | Source | Publisher | Location | Usage |
|---|---|---|---|---|---|---|
| HELLO_WORLD | 1.0 | Free | MarketPlace | INF | url:// | 0 |
| INCIDENT_MGMT | 1.0 | Paid | MarketPlace | INF | url:// | 1 |
| CONTACTSYNC | 1.0 | Free | Tenancy | Soda | url:// | 1 |
| FUSION_IMPORT | 1.0 | Free | MarketPlace | TC | url:// | 10 |
| FUSION_IMPORT | 2.0 | Paid | MarketPlace | TC | url:// | 75 |

Example 3—Workflow Table

In accordance with an embodiment, as additional business workflows or integration flows are added to or activated within the system, the collection service can receive an indication of an integration archive that defines the workflow, and the characteristics server can then extract and Example 4—Secondary Characteristics In accordance with an embodiment, the system can associate workflows with the above secondary characteristics by, e.g., tying or mapping the above two tables to each other. For example, as illustrated in Example 5, in accordance with an embodiment, a particular workflow may have a plurality of secondary characteristics; and similarly each secondary characteristic may belong to several different workflows:

| Integration_ID | Characteristic |
|---|---|
| HELLO_WORLD | 1 |
| HELLO_WORLD | 2 |
| INCIDENT_MGMT | 1 |
| INCIDENT_MGMT | 3 |
| FUSION_IMPORT | 4 |
| FUSION_IMPORT | 5 |

Example 5—Workflow-Characteristic Association

Discovery of Workflows using Business Characteristics

Integration platforms, such as iPaaS, can support discoverability to search for and discover out workflows by name. In accordance with an embodiment, the system provides a unified mechanism to discover workflows built by different individuals/companies, from different repositories, with a plurality of characteristics.

As described above, in accordance with an embodiment, each of the actors within a workflow has characteristics, for example one or more primary characteristics and/or secondary characteristics; wherein the union of the characteristics of each actor in a workflow, along with the characteristics of the workflow itself, collectively is defined as the characteristics of a workflow.

In accordance with an embodiment, the system allows users to combine one or more of these characteristics to discover a desirable integration flow. For example, the system can guide a user to build the criteria for discovering useful business integration flows, through the use of graphical user interfaces with selectable options, or digital assistants where the system can utilize natural language processing to convert user instructions into a discovery criteria.

Figure 10:
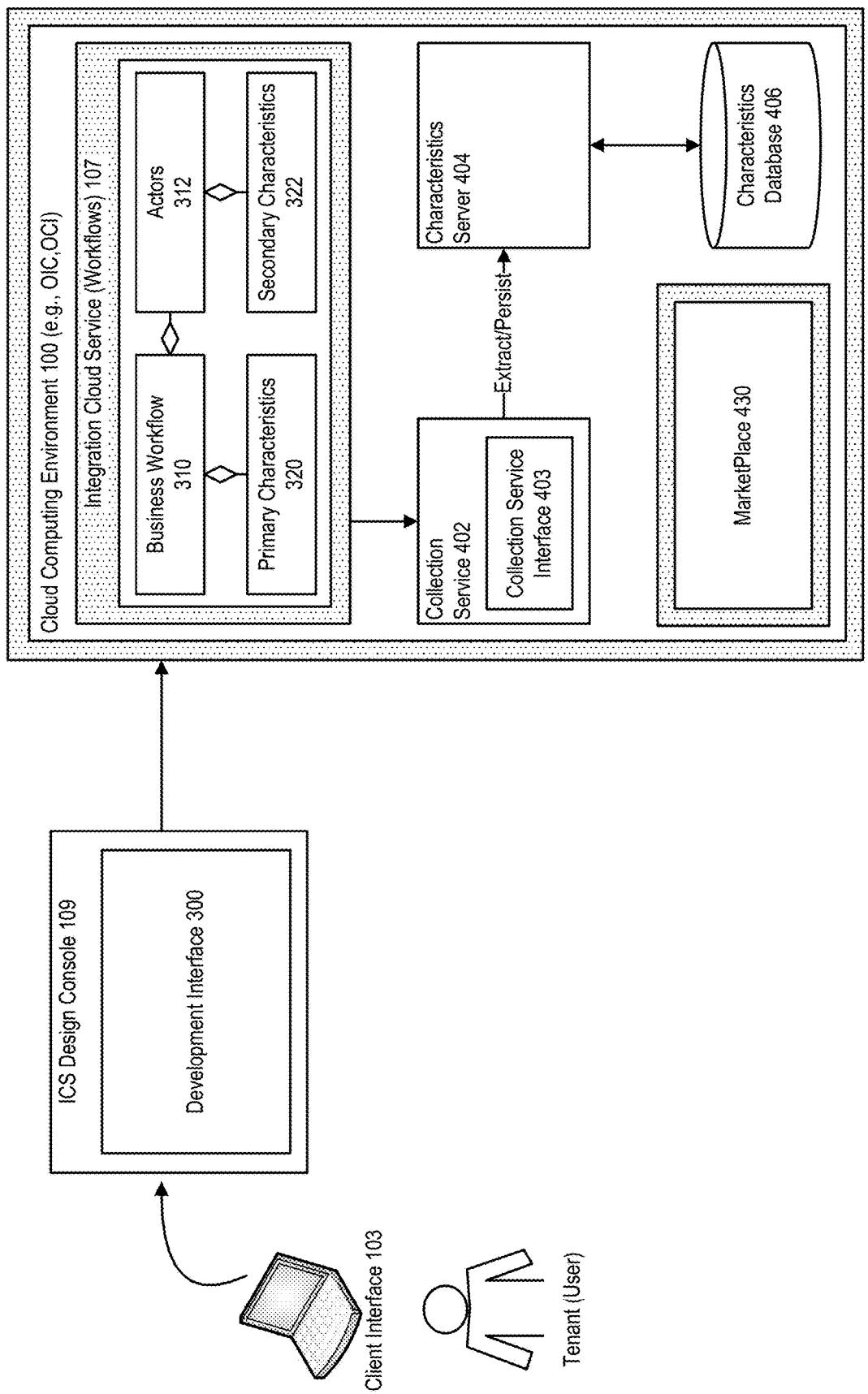
FIG. 10 further illustrates how different types of users can contribute integration cloud service workflows, for use with the system, in accordance with an embodiment.
Figure 11:
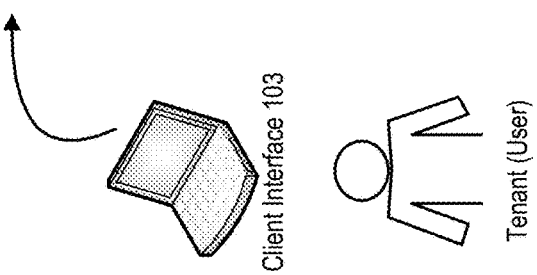
FIG. 11 illustrates an example user interface that provides access to viewing and controlling discovery criteria, in accordance with an embodiment.
Figure 12:
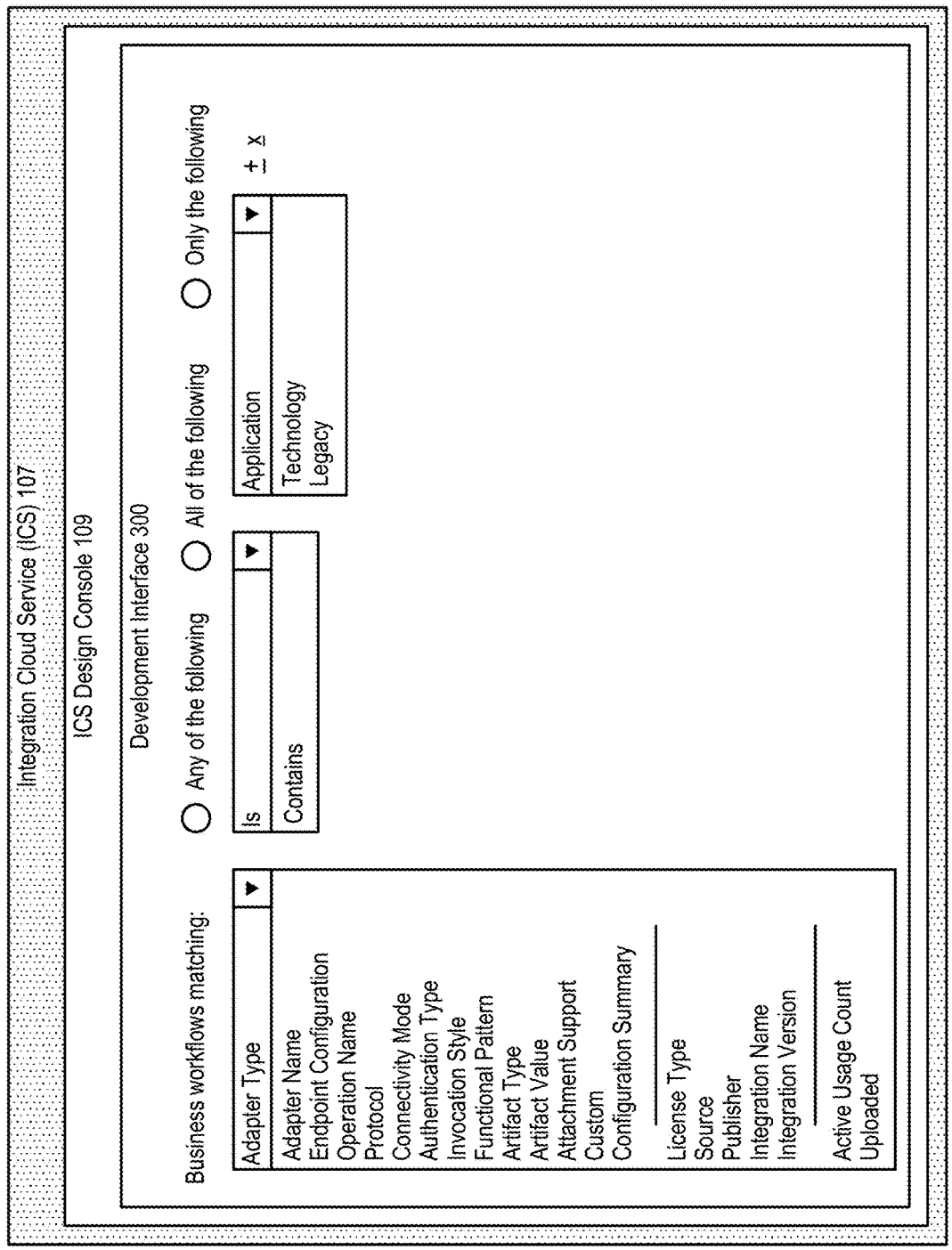
FIG. 12 illustrates another example user interface that provides access to viewing and controlling discovery criteria, in accordance with an embodiment.
Figure 12:
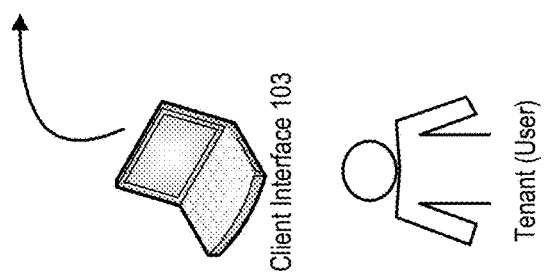
Figure 13:
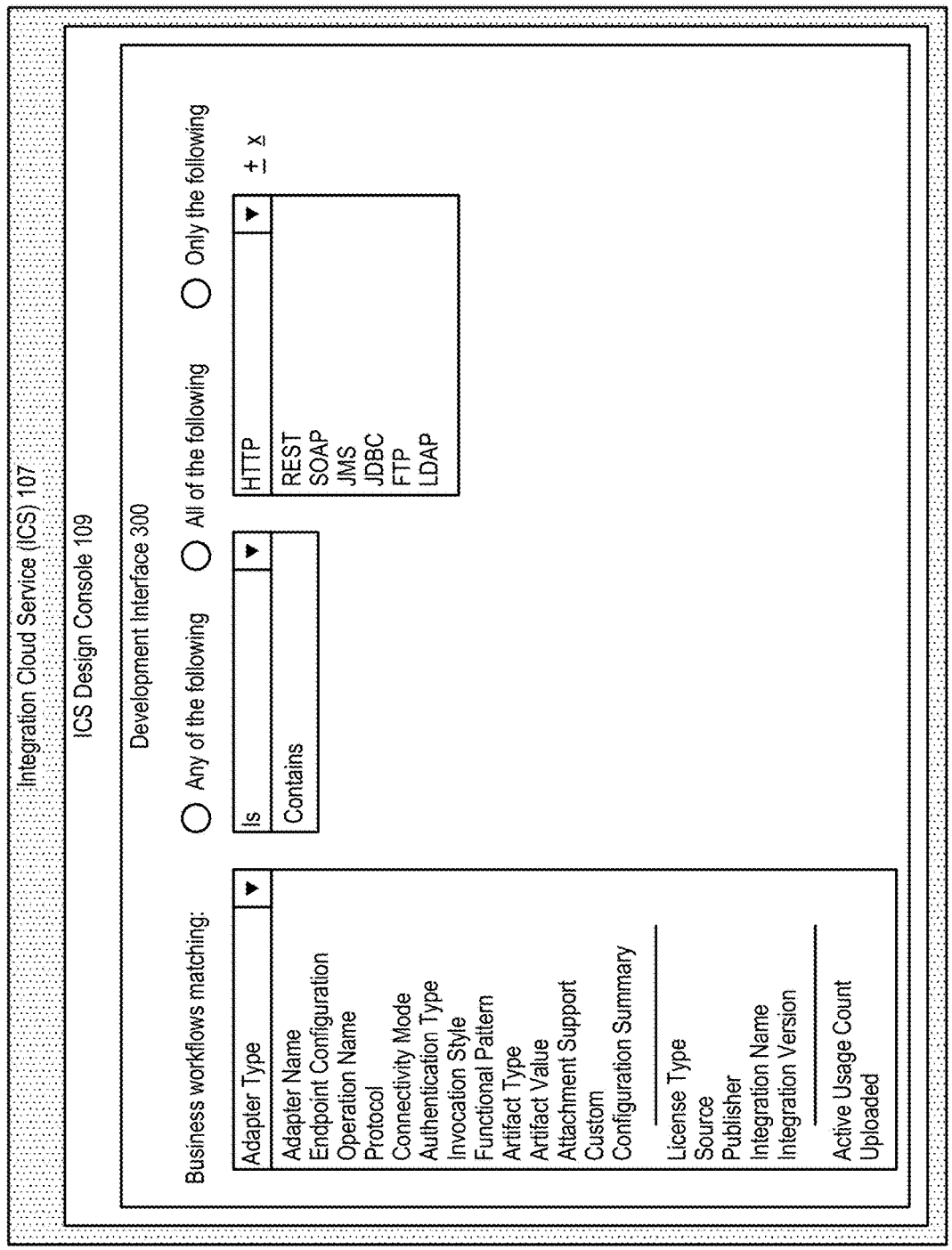
FIG. 13 illustrates another example user interface that provides access to viewing and controlling discovery criteria, in accordance with an embodiment.
Figure 13:
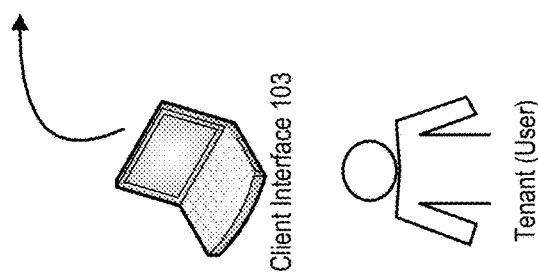
Figure 14:
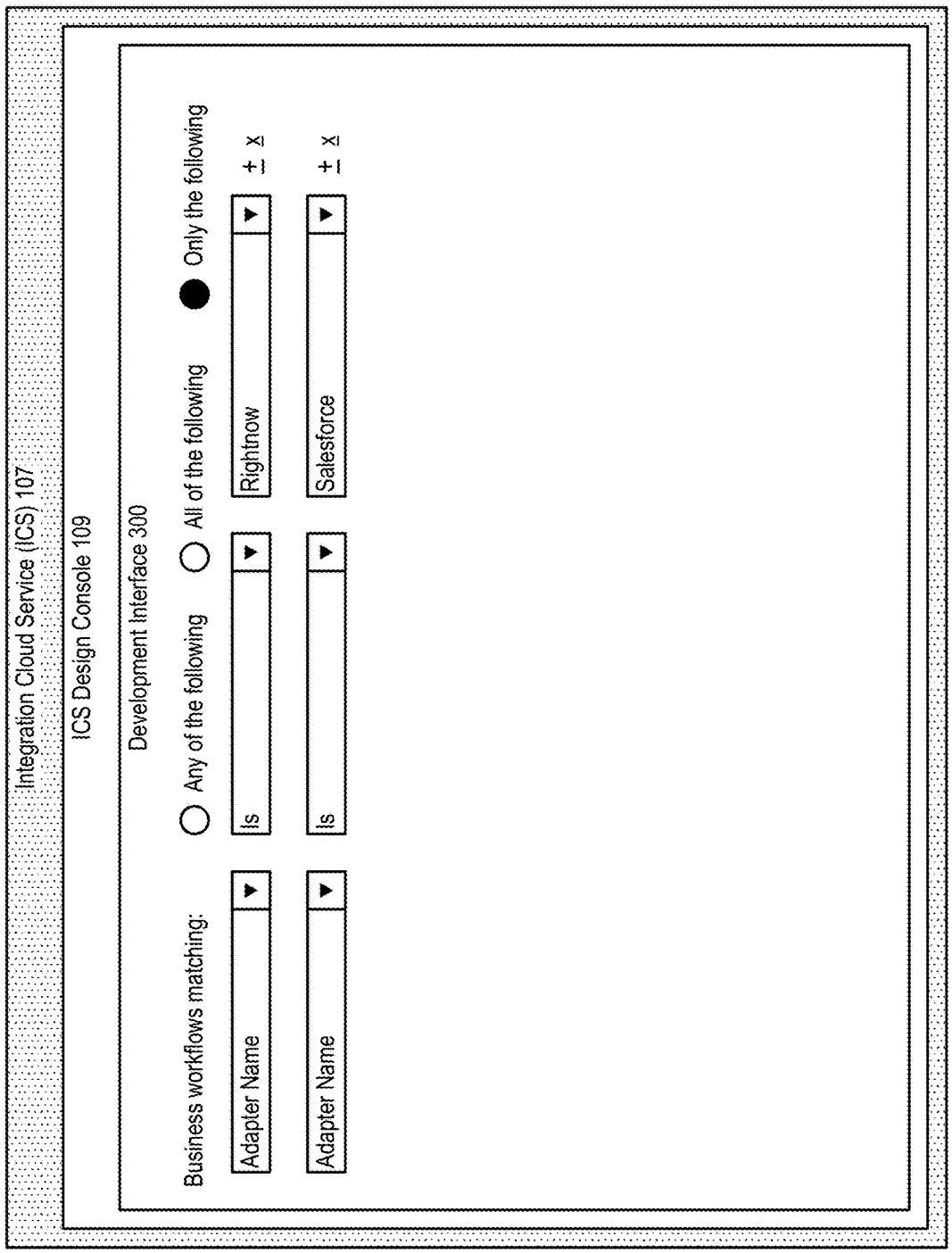
FIG. 14 illustrates another example user interface that provides access to viewing and controlling discovery criteria, in accordance with an embodiment.
Figure 14:
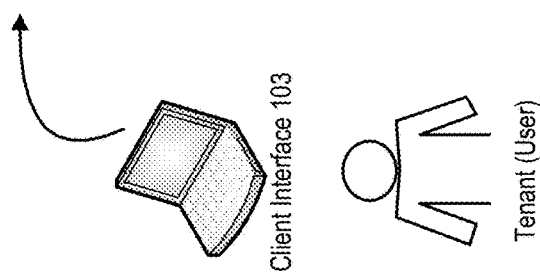

FIG. 10 further illustrates how different types of users can contribute integration cloud service workflows, for use with the system, in accordance with an embodiment.

As illustrated in FIG. 10, in accordance with an embodiment, a development user interface 300 provides a user with the flexibility to search workflows matching any/all/only the discovery criteria.

FIGS. 11-14 illustrate an example user interface that provides access to viewing and controlling discovery criteria, in accordance with an embodiment.

As illustrated in FIGS. 11-14, in accordance with an embodiment, each discovery criterion can be built by the user using contextual objects as displayed within the user interface. Based on a selection of the dimension, only relevant propositions or value set is exposed for the user to specify where applicable. If a dimension is a free flow text and can assume any value, then the value will be a text field.

In accordance with an embodiment, the approach can be extended to include a mechanism to specify the rejection criteria to limit the result set, or otherwise further specify the discovery criteria.

II. Marketplace Environment and Conversational Interface

In accordance with an embodiment, the systems and methods described herein can be used in providing a marketplace that employs a conversational interface to guide users in selecting and retrieving integration artifacts, for example workflows or other assets, to address particular needs.

For example, in accordance with an embodiment, a digital assistant can be employed to allow discovery of workflows by building a discovery criteria based on a knowledge of characteristics associated with various business workflows or integration flows, and through interactive conversations by a user with the digital assistant.

Figure 15:
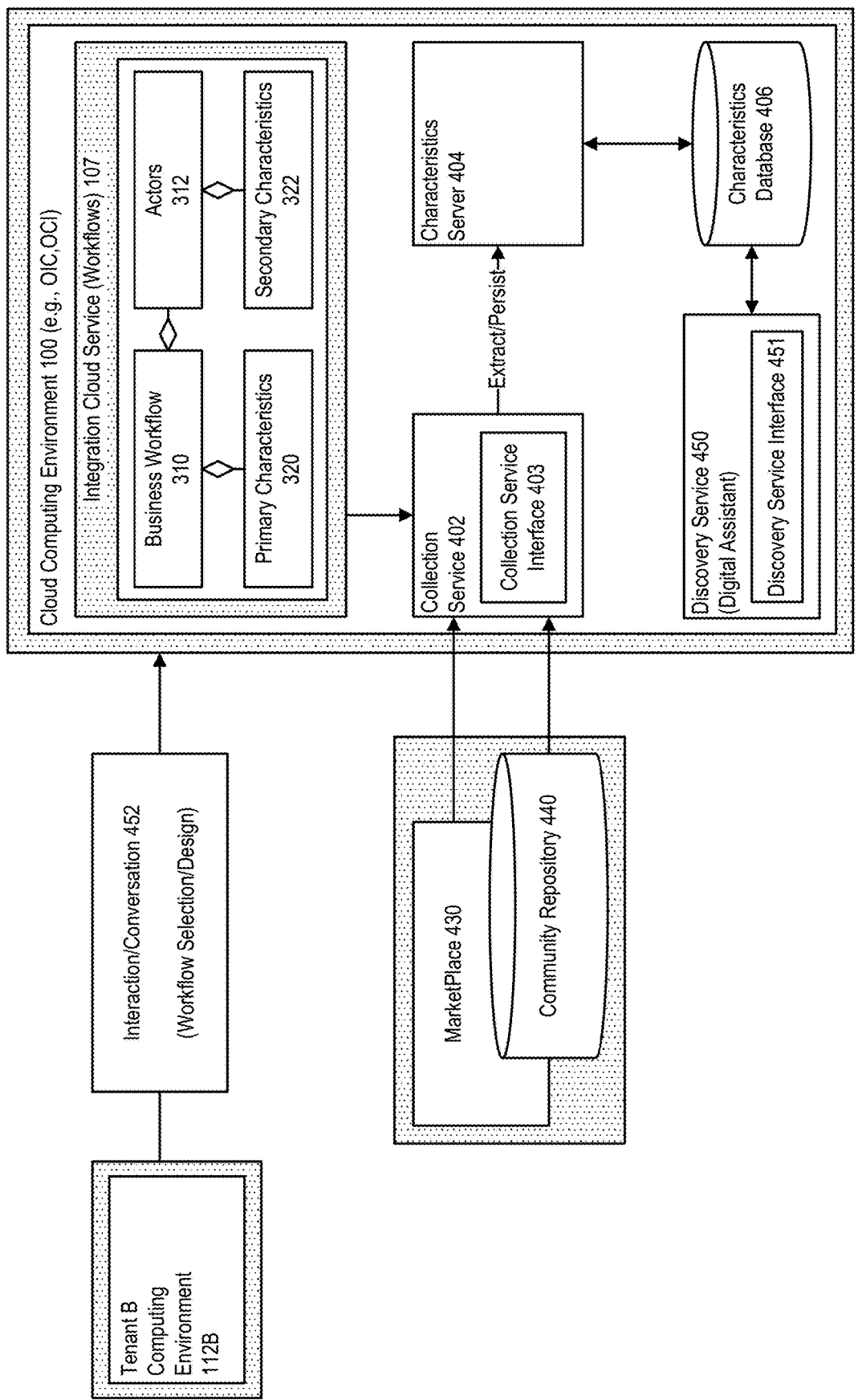
FIG. 15 illustrates the use of a discovery service, for example a digital assistant or recommendation engine, with an integration cloud service, in accordance with an embodiment.

FIG. 15 illustrates the use of a discovery service, for example a digital assistant or recommendation engine, with an integration cloud service, in accordance with an embodiment.

In accordance with an embodiment, to recommend relevant workflows, the system can build the discovery criteria based on an integration platform tenant profile. For example, the integration platform can build a tenant profile to provider recommendations to the integration tenant. Tenants on the integration platform create connections to their business assets to be able to build workflows spanning these assets. The connection types provide information about the type of assets and the potential recommendations that can be given to an integration tenant.

In accordance with an embodiment, for example, a tenant may have connections to two external applications. This can imply implies that recommendation of workflows with one or more of these actors is a potential match.

In accordance with an embodiment, a discovery service 450 and discovery service interface 451 can be provided. The discovery criteria collected from a user is passed to the discovery service. The discovery service embeds the query processing engine that prepares, executes, and retrieves business process flows corresponding to the collected characteristics. The discovery service returns the final set of business process flows back to the frontend.

In accordance with an embodiment, a query processing engine can be provided. Once the discovery criteria has been determined based on user input through the user interface or using a digital assistant or based on the tenant profile, the system and methods can process this and retrieve the relevant integration flows that match the criteria.

Figure 16:
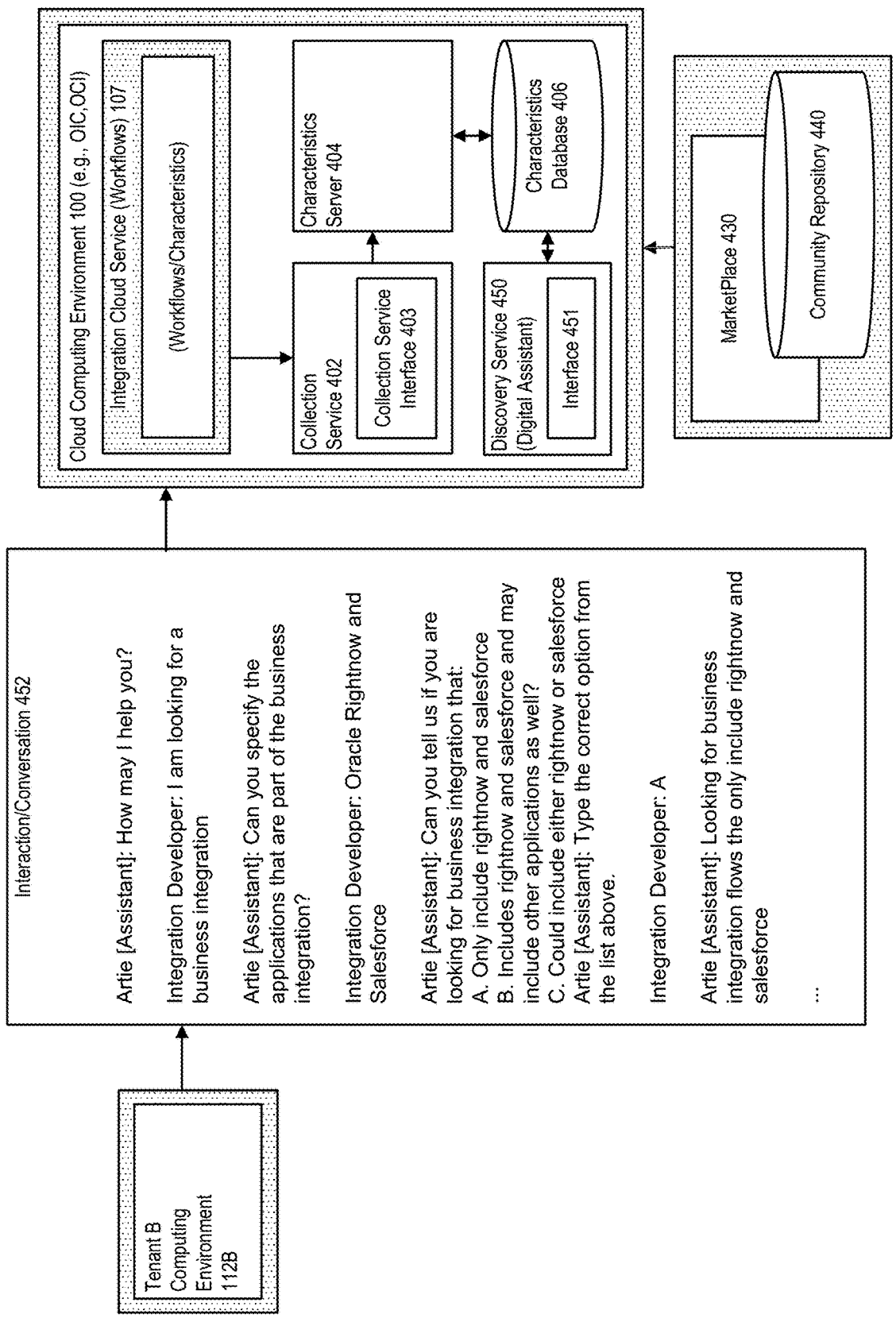
FIG. 16 further illustrates the use of a digital assistant in providing a marketplace that employs a conversational interface, in accordance with an embodiment.
Figure 17:
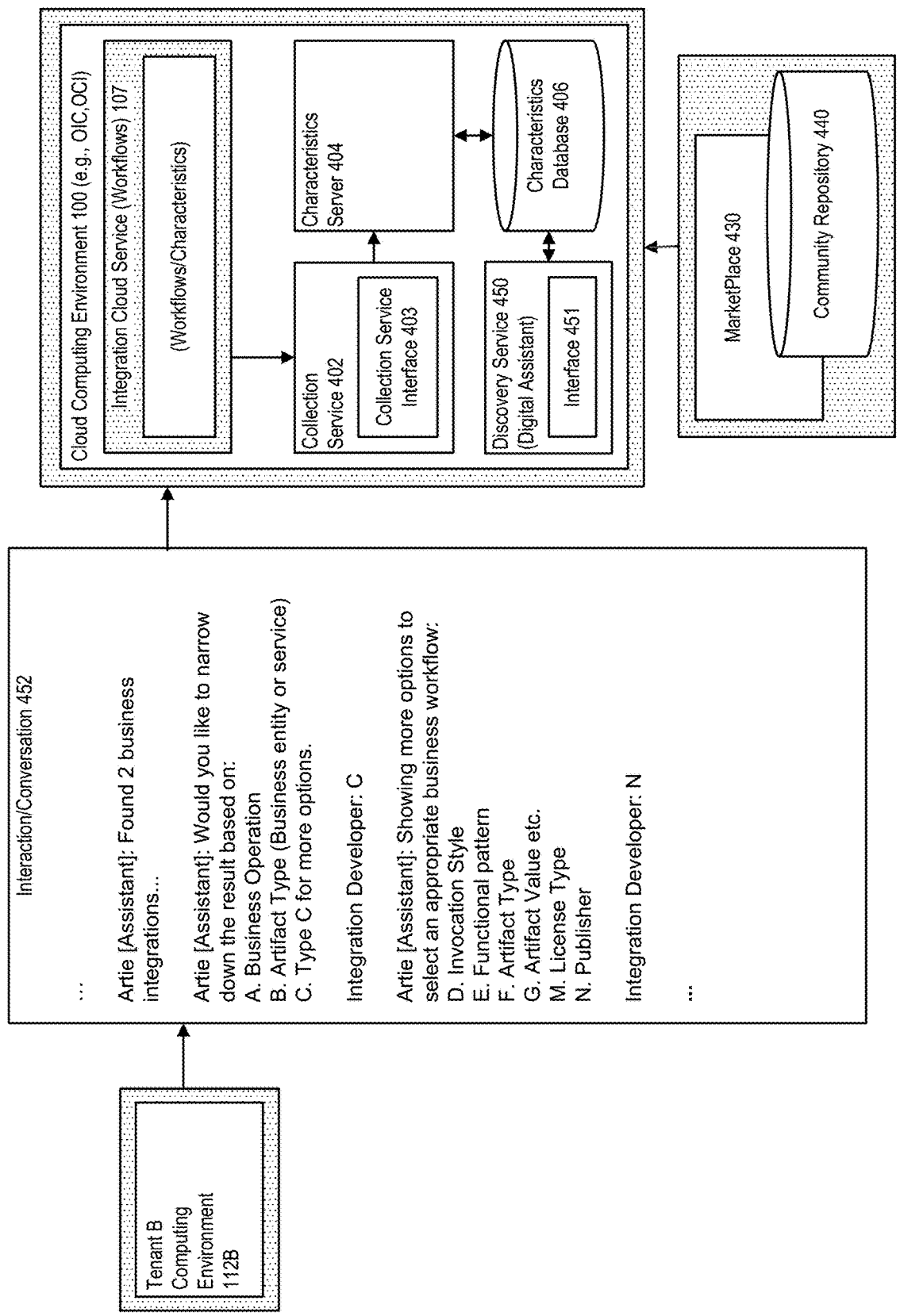
FIG. 17 further illustrates the use of a digital assistant in providing a marketplace and conversational interface, in accordance with an embodiment.
Figure 18:
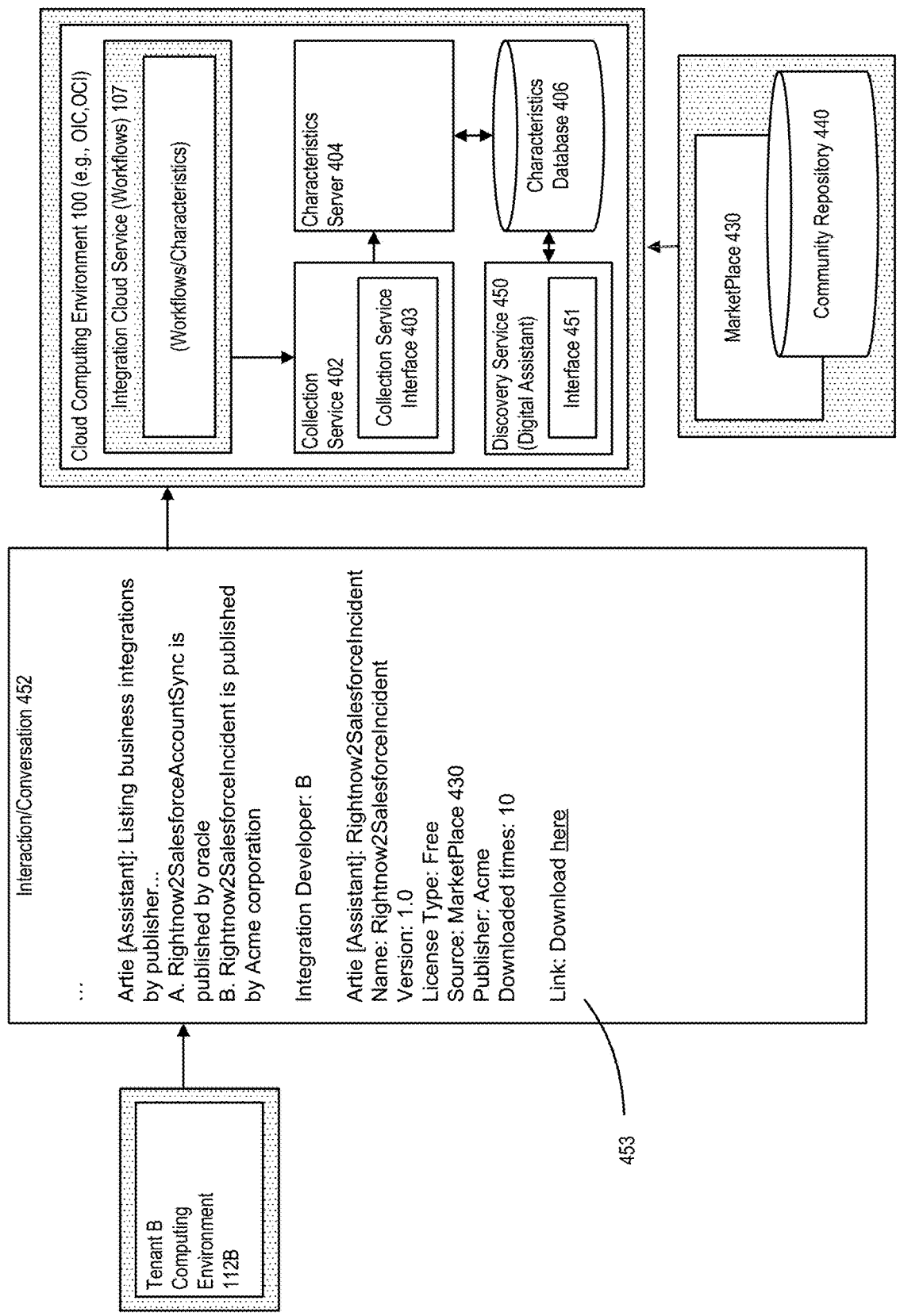
FIG. 18 further illustrates the use of a digital assistant in providing a marketplace and conversational interface, in accordance with an embodiment.

FIGS. 16-18 further illustrate the use of a digital assistant in providing a marketplace that employs a conversational interface, in accordance with an embodiment.

For example, as illustrated in FIGS. 16-18, and in Example 6 below, the discovery service can be provided as an assistant, that receives input via a user interaction/conversation 452, and based on the tenant profile, retrieves one or more integration flows that match the user-provided criteria:

---

Artie [Assistant]: How may I help you?
Integration Developer: I am looking for a business integration
Artie [Assistant]: Can you specify the applications that are part of the business integration?
Integration Developer: Oracle Rightnow & Salesforce
Artie [Assistant]: Can you tell us if you are looking for business integration that:
A. Only include rightnow and salesforce
B. Includes rightnow and salesforce and may include other applications as well?
C. Could include either rightnow or salesforce
Artie [Assistant]: Type the correct option from the list above.
Integration Developer: A
Artie [Assistant]: Looking for business integration flows the only include rightnow and salesforce . . .
Artie [Assistant]: Found 2 business integrations . . .
Artie [Assistant]: Would you like to narrow down the result based on:
A. Business Operation
B. Artifact Type (Business entity or service)
C. Type C for more options.

-continued

```
Integration Developer: C
Artie [Assistant]: Showing more options to select an appropriate business workflow:
D. Invocation Style
E. Functional pattern
F. Artifact Type
G. Artifact Value etc.
M. License Type
N. Publisher
Integration Developer: N
Artie [Assistant]: Listing business integrations by publisher . . .
A. Rightnow2SalesforceAccountSync is published by oracle
B. Rightnow2SalesforceIncident is published by Acme corporation
Integration Developer: B
Artie [Assistant]: Rightnow2SalesforceIncident
Name: Rightnow2SalesforceIncident
Version: 1.0
License Type: Free
Source: MarketPlace 430
Publisher: Acme
Downloaded times: 10
Link: Download here
```

Example 6—System-Guided Conversation

Discovery Service Interface

Figure 19:
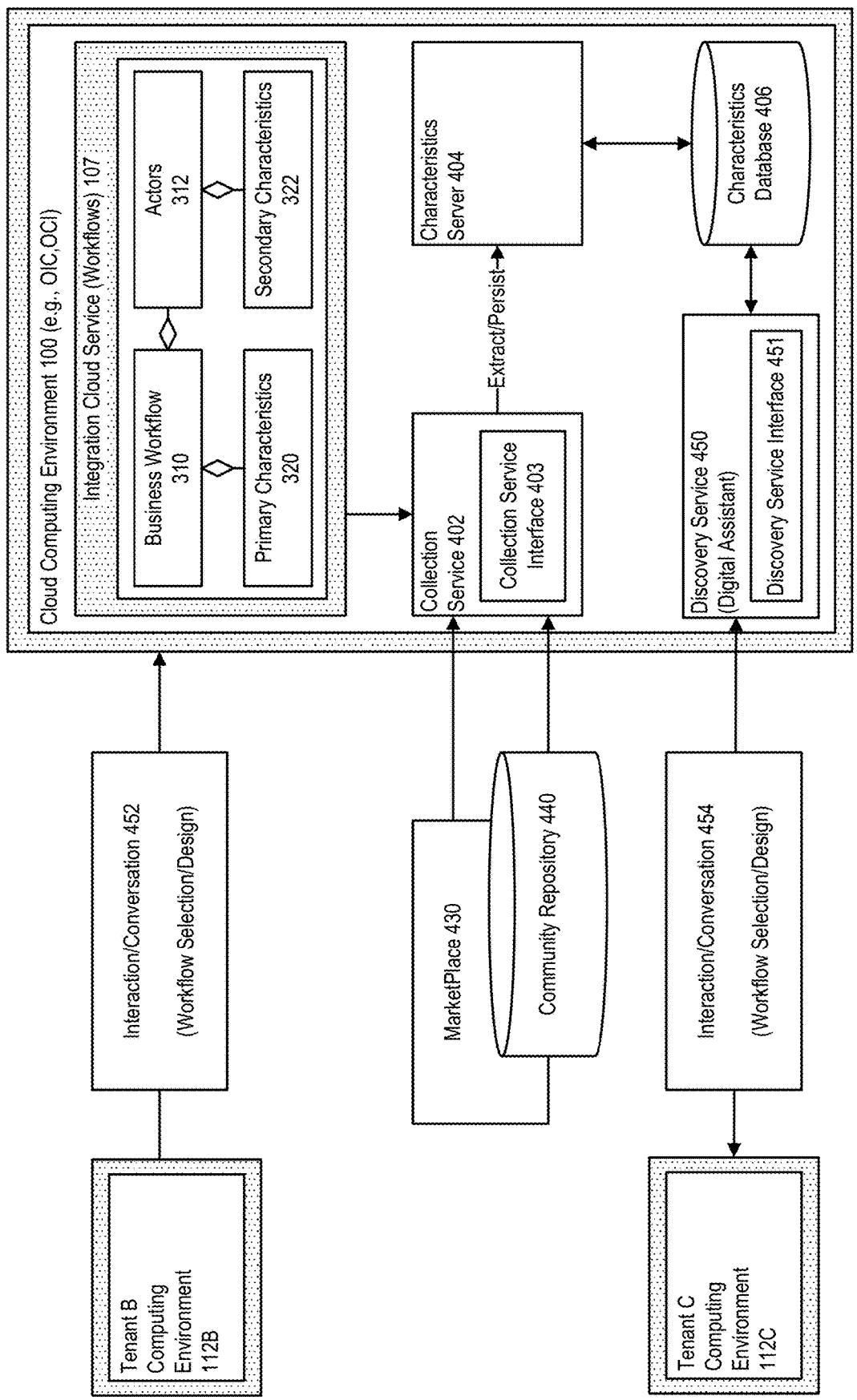
FIG. 19 further illustrates the use of a discovery service, for example a digital assistant or recommendation engine, with an integration cloud service, in accordance with an embodiment.

FIG. 19 further illustrates the use of a discovery service, for example a digital assistant or recommendation engine, with an integration cloud service, in accordance with an embodiment.

In accordance with an embodiment, the discovery criteria collected from a user is passed to the discovery service. The discovery service can embed a query processing engine that prepares, executes and retrieves the necessary business process flows corresponding to the collected characteristics, and return the final set of business process flows back to the frontend:

| Method | Post |
|---|---|
| Endpoint URL | https://<host>:<port>/flows/discover |
| Request | Request Json<br>{<br>  "group": "ANY",<br>  "Criteria": [<br>    {<br>      "dimension": "AdapterType",<br>      "proposition": "is",<br>      "value": "ERP"<br>    },<br>    {<br>      "dimension": "AdapterType",<br>      "proposition": "is",<br>      "value": "Rightnow"<br>    }<br>  ]<br>} |
| RESPONSE | 202 (Accepted)<br>Response<br>[<br>  {<br>    "name": "Fusion_import",<br>    "version": "1.0",<br>    "License": "free",<br>    "Source": "marketPlace",<br>    "Publisher": "Oracle",<br>    "Usage": "10",<br>    "download-link" : "http://marketplace.oracle.com/integrationcloud/flows/{integration_id}"<br>  },<br>  {<br>    "name": "Fusion_import",<br>    "version": "2.0",<br>    "License": "paid",<br>    "Source": "marketPlace",<br>    "Publisher": "Oracle",<br>    "Usage": "75",<br>    "download-link" : "http://marketplace.oracle.com/integrationcloud/flows/{integration_id}"<br>  }<br>] |

Example 7—Discovery Service Interface

Example Query

In accordance with an embodiment, a sample query can be: "Discover all business workflows where adapterName is ER". Then, the query processing engine will roughly translate this as:
1. Select ID from secondary_characteristics
    where adapterName=¿ER¿
2. For-each ID:
    select distinct integration_id from business_characteristics
    where ID=$ID
3. For-each integration_id:
    select * from business workflows
    where integration_id=$integration_id In accordance with an embodiment, the query can be arbitrarily complex; and the results of the discovered workflows can be displayed.

| Integration_ID | Version | License | Source | Publisher | Usage | Download |
|---|---|---|---|---|---|---|
| FUSION_IMPORT | 1.0 | Free | Market-Place | TCS | 10 | v |
| FUSION_IMPORT | 2.0 | Paid | Market-Place | TCS | 75 | v |

Example 8—Artifact (e.g., Workflow) Result

In accordance with an embodiment, an end user can sort the result-set by any of the attributes like Usage, Source etc. and download the workflow using the link next to it.

Figure 20:
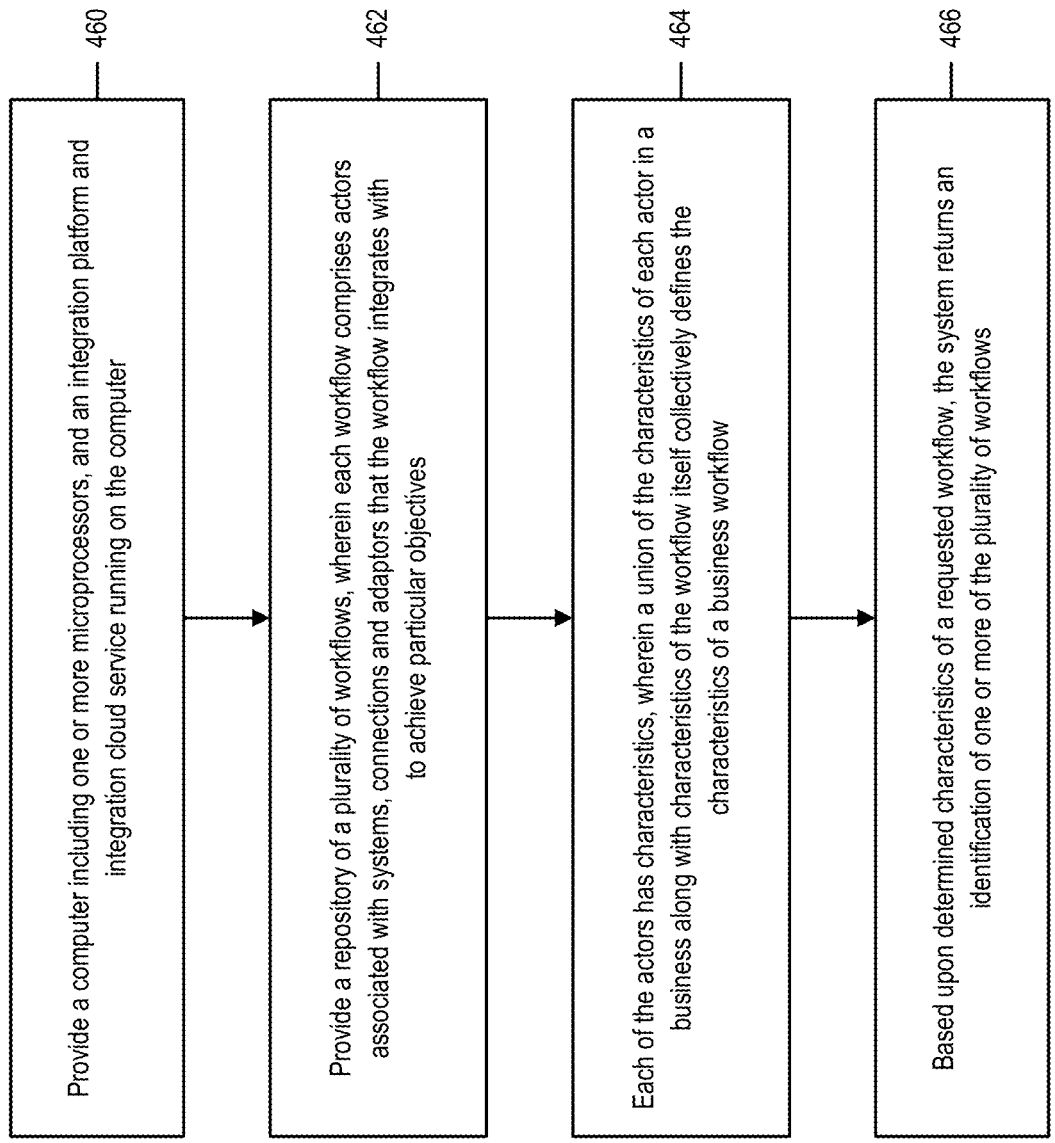
FIG. 20 illustrates a method for determination and use of workflow characteristics with an integration cloud service or other computing environment, in accordance with an embodiment.

FIG. 20 illustrates a method for determination and use of workflow characteristics with an integration cloud service or other computing environment, in accordance with an embodiment.

As illustrated in FIG. 20, in accordance with an embodiment, at step 460, a computer is provided, including one or more microprocessors, and an integration platform and integration cloud service running on the computer.

At step 462, a repository of a plurality of workflows is provided, wherein each workflow comprises actors associated with systems, connections and adaptors that the workflow integrates with to achieve particular objectives.

At step 464, each of the actors has characteristics, wherein a union of the characteristics of each actor in a business along with characteristics of the workflow itself collectively defines the characteristics of a business workflow.

At step 466, based upon determined characteristics of a requested workflow, the system returns an identification of one or more of the plurality of workflows In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may be implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention.

Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for determination and use of workflow characteristics with an integration cloud service or other computing environment, comprising:
    a computer including one or more microprocessors;
    an integration platform running on the computer;
    a repository of a plurality of workflows, wherein each workflow comprises actors associated with systems, connections and adaptors that the workflow integrates with to achieve particular objectives, where at least one actor comprises an application external to the integration platform;
    wherein each of the actors comprises characteristics, wherein a union of the characteristics of each actor in a workflow along with characteristics of the workflow itself collectively defines the characteristics of a workflow; and
    wherein, based upon determined characteristics of a requested workflow, one or more of the plurality of workflows at the repository are determined to meet at least some of the determined characteristics and are displayed as suggested workflows via a graphical user interface, each of the displayed one or more of the plurality of workflows comprising a connection to an application external to the integration platform, the application external to the integration platform being associated with a discovery criteria associated with a user.

2. The system of claim 1, wherein a collection service can receive an indication of an integration archive that defines a business workflow or integration flow, wherein a characteristics server can then extract and persist the characteristics associated with the workflow, for subsequent use in providing a determination of workflows.

3. The system of claim 1, wherein a discovery service or digital assistant can be employed to allow discovery of workflows by building the discovery criteria based on a knowledge of characteristics associated with various business workflows or integration flows, and through interactive conversations by the user with the digital assistant.

4. The system of claim 1, wherein definitions of business workflows or integration flows can be stored or persisted as integration archives in various repositories, such as, for example, repositories of a tenant's own integration instance, repositories of an integration marketplace, and/or community repositories.

5. The system of claim 1, wherein the system is provided within an integration cloud platform that enables the integration of various software products or applications, which can then be made accessible to consumers via a cloud computing environment.

6. A method for determination and use of workflow characteristics with an integration cloud service or other computing environment, comprising:
    providing a computer including one or more microprocessors, and an integration platform and integration cloud service running on the computer;
    providing a repository of a plurality of workflows, wherein each workflow comprises actors associated with systems, connections and adaptors that the workflow integrates with to achieve particular objectives;
    wherein each of the actors has characteristics, wherein a union of the characteristics of each actor in a workflow along with characteristics of the workflow itself collectively defines the characteristics of a workflow; and
    wherein based upon determined characteristics of a requested workflow, one or more of the plurality of workflows at the repository are determined to meet at least some of the determined characteristics and are displayed as suggested workflows via a graphical user interface, each of the displayed one or more of the plurality of workflows comprising a connection to an application external to the integration platform, the application external to the integration platform being associated with a discovery criteria associated with a user.

7. The method of claim 6, wherein a collection service can receive an indication of an integration archive that defines a business workflow or integration flow, wherein a characteristics server can then extract and persist the characteristics associated with the workflow, for subsequent use in providing a determination of workflows.

8. The method of claim 6, wherein a discovery service or digital assistant can be employed to allow discovery of workflows by building the discovery criteria based on a knowledge of characteristics associated with various business workflows or integration flows, and through interactive conversations by the user with the digital assistant.

9. The method of claim 6, wherein definitions of business workflows or integration flows can be stored or persisted as integration archives in various repositories, such as, for example, repositories of a tenant's own integration instance, repositories of an integration marketplace, and/or community repositories.

10. The method of claim 6, wherein the method is provided within an integration cloud platform that enables the integration of various software products or applications, which can then be made accessible to consumers via a cloud computing environment.

11. A non-transitory computer readable storage medium, having instructions for determination of workflows based on characteristics in an integration environment, which when read an executed cause a computer to perform a method comprising:
    providing a computer including one or more microprocessors;
    providing an integration platform running on the computer;

providing a repository of a plurality of workflows, wherein each workflow comprises actors associated with systems, connections and adaptors that the workflow integrates with to achieve particular objectives, where at least one actor comprises an application external to the integration platform;

wherein each of the actors comprises characteristics, wherein a union of the characteristics of each actor in a workflow along with characteristics of the workflow itself collectively defines the characteristics of a workflow; and based upon determined characteristics of a requested workflow, determining one or more of the plurality of workflows at the repository to meet at least some of the determined characteristics; and displaying the determined one or more of the plurality of workflows as suggested workflows via a graphical user interface, each of the displayed one or more of the plurality of workflows comprising a connection to an application external to the integration platform, the application external to the integration platform being associated with a discovery criteria associated with a user.

12. The non-transitory computer readable storage medium of claim 11, wherein a collection service can receive an indication of an integration archive that defines a business workflow or integration flow, wherein a characteristics server can then extract and persist the characteristics associated with the workflow, for subsequent use in providing a determination of workflows.

13. The non-transitory computer readable storage medium of claim 11, wherein a discovery service or digital assistant can be employed to allow discovery of workflows by building the discovery criteria based on a knowledge of characteristics associated with various business workflows or integration flows, and through interactive conversations by the user with the digital assistant.

14. The non-transitory computer readable storage medium of claim 11, wherein definitions of business workflows or integration flows can be stored or persisted as integration archives in various repositories, such as, for example, repositories of a tenant's own integration instance, repositories of an integration marketplace, and/or community repositories.

15. The non-transitory computer readable storage medium of claim 11, wherein the method is provided within an integration cloud platform that enables the integration of various software products or applications, which can then be made accessible to consumers via a cloud computing environment.

* * * * *

UNITED STATES PATENT AND TRADEMARK OFFICE
CERTIFICATE OF CORRECTION

PATENT NO. : 11,888,944 B2
APPLICATION NO. : 17/735825
DATED : January 30, 2024
INVENTOR(S) : Kaushal et al.

It is certified that error appears in the above-identified patent and that said Letters Patent is hereby corrected as shown below:

In the Specification

In Column 17, Line 15, delete "business workflows" and insert -- business_workflows --, therefor.

Signed and Sealed this
Fourteenth Day of May, 2024

Katherine Kelly Vidal
*Director of the United States Patent and Trademark Office*